(12) United States Patent
Chang et al.

(10) Patent No.: US 9,582,317 B2
(45) Date of Patent: Feb. 28, 2017

(54) METHOD OF USING USE LOG OF PORTABLE TERMINAL AND APPARATUS USING THE SAME

(71) Applicant: Samsung Electronics Co., Ltd., Suwon-si, Gyeonggi-do (KR)

(72) Inventors: Seokjin Chang, Suwon-si (KR); Sangho Yi, Seoul (KR); Muwoong Lee, Cheongju-si (KR); Sumin Lim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/275,233

(22) Filed: May 12, 2014

(65) Prior Publication Data

US 2014/0337861 A1    Nov. 13, 2014

Related U.S. Application Data

(60) Provisional application No. 61/821,996, filed on May 10, 2013.

(30) Foreign Application Priority Data

Jul. 15, 2013  (KR) .......................... 10-2013-0082882

(51) Int. Cl.
| | | |
|---|---|---|
| G06F 3/00 | (2006.01) | |
| G06F 9/44 | (2006.01) | |
| G06F 9/46 | (2006.01) | |
| G06F 13/00 | (2006.01) | |
| G06F 9/48 | (2006.01) | |
| H04W 52/02 | (2009.01) | |

(52) U.S. Cl.
CPC ...... *G06F 9/4843* (2013.01); *H04W 52/0258* (2013.01); *Y02B 60/144* (2013.01)

(58) Field of Classification Search
CPC .................................................... G06F 9/4843
USPC ......................................................... 719/313
See application file for complete search history.

(56) References Cited

U.S. PATENT DOCUMENTS

| | | | |
|---|---|---|---|
| 7,574,661 B2 | 8/2009 | Matsuura et al. | |
| 2006/0156209 A1* | 7/2006 | Matsuura et al. | 714/798 |
| 2009/0160792 A1* | 6/2009 | Morohoshi et al. | 345/173 |
| 2009/0240647 A1 | 9/2009 | Green et al. | |
| 2011/0106736 A1* | 5/2011 | Aharonson et al. | 706/12 |
| 2011/0269456 A1* | 11/2011 | Krishnaswamy et al. | 455/426.1 |

(Continued)

OTHER PUBLICATIONS

Matthew Gast , 802.11 Wireless Network, The Definitive Guide, 2nd Edition, 2002, O-Reilly.*

*Primary Examiner* — Timothy A Mudrick
(74) *Attorney, Agent, or Firm* — Jefferson IP Law, LLP

(57) ABSTRACT

A method of determining a second application related to a first application being executed by using a use log of a portable terminal and executing the second application according to a user input and an apparatus for supporting the same are provided. The portable terminal may determine the second application related to the first application being executed, based on a use log collected in a previous context state identical or similar to a current context state of a user. At this time, in order to determine the current context state of the user, the portable terminal may use information related to a location of the portable terminal and information related to a current time.

20 Claims, 20 Drawing Sheets

(56) References Cited

U.S. PATENT DOCUMENTS

2012/0164971 A1\* 6/2012 Choi et al. .................... 455/405

\* cited by examiner

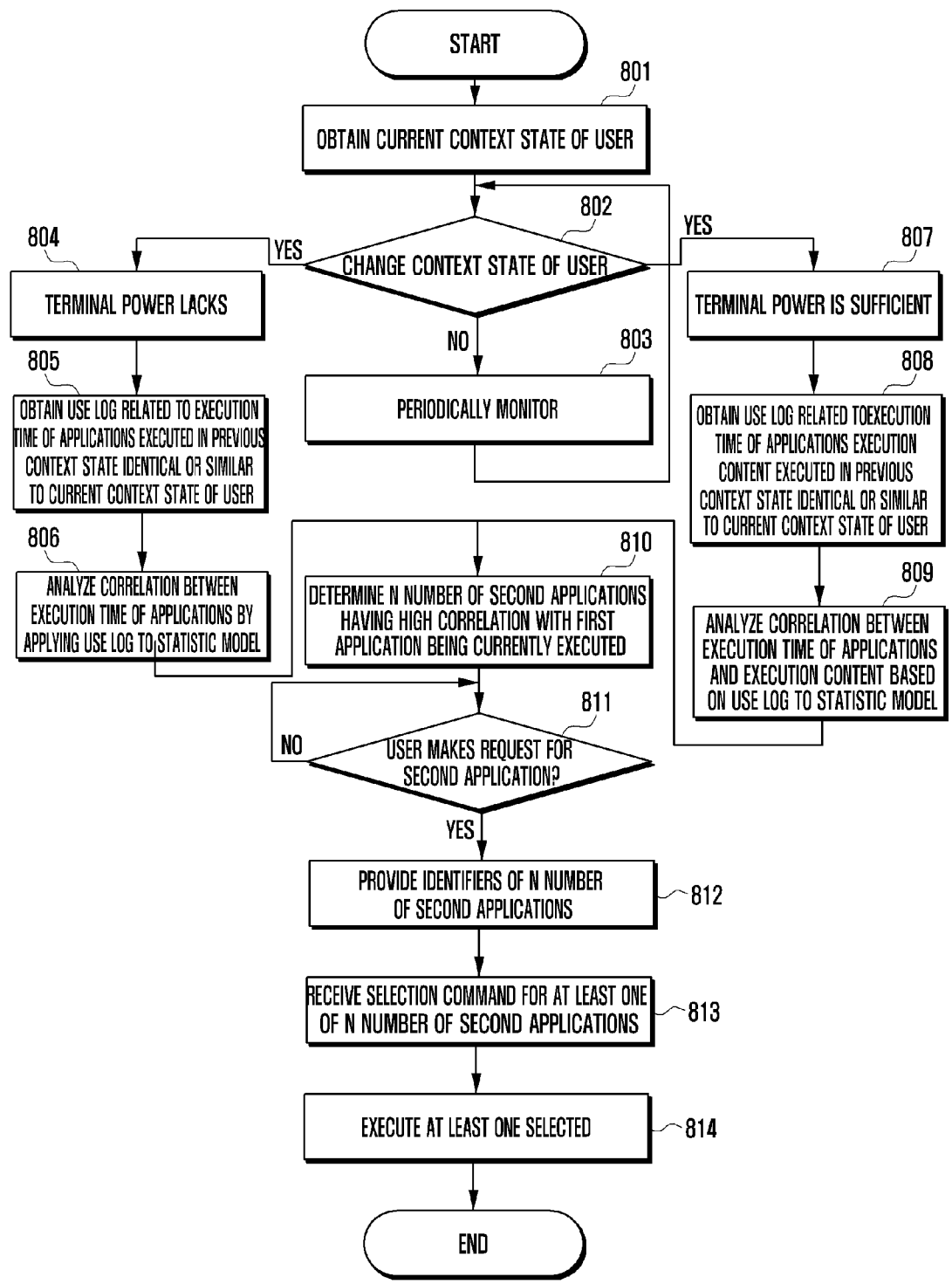

FIG. 11

| USE LOG TYPE | DATA TYPE | LOG DESCRIPTION |
|---|---|---|
| TIMESTAMP_UTC | DateTime | Last updated time of this record in UTC (START_TIME or STOP_TIME) |
| TIMESTAMP_WT | DateTime | Last updated time of this record in WT (START_TIME or STOP_TIME) |
| CATEGORY** | String | Category list of the application (ex. "sports;game;") |
| TYPE | Int | Application type (preloaded: 1, downloaded: 2) |
| LAUNCH_TYPE | nt | Launch type of the application (by user:1, by app: 2) |
| START_TIME | DateTime | Start time of using the application (when the application is shown on foreground) |
| STOP_TIME | DateTime | Stop time of using the application (when the application is moved to background or is terminated) |
| DURATION | Int (sec) | Duration of app usage |
| PLACE_ID** | String | IDs of the place (ex. "1;2;") |
| PLACE_NAME** | String | Names of the place id (ex. "home;office;") |
| PLACE_CATEGORY** | String | Categories of the place (ex. "C1;C2;C3;") |
| LONGITUDE | Double | Longitude of the location where the user is when the call is started |
| LATITUDE | Double | Latitude of the location where the user is when the call is started |
| APP_ID | String | Application id |
| APP_SUB_ID | String | Application sub id (ex. class name) |

FIG. 12

| | CONTEXT STATE OF USER | | | FIRST APPLICATION | SECOND APPLICATION HAVING HIGH CORRELATION WITH FIRST APPLICATION |
|---|---|---|---|---|---|
| | ACTION TYPE | TRANSPORTATION TYPE | PLACE TYPE | | |
| 1201 | Go_to_work | Bus | – | Facebook | music_player; Snote; ChatON |
| 1202 | Back_from_work | Bus | – | E-mail | E-book; Facebook; Web_browser(news.naver.com) |
| 1203 | Shopping | – | Homeplus | T_money | Wallet; Facebook; Web_browser(www.danawa.com) |
| 1204 | Driving | Mycar | – | Music_player | Call; Radio; navigation |
| 1205 | Shopping | – | Bookstore | Snote | facebook; web_browser(www.yes24.com); T_money |
| 1206 | Strolling | Walk | – | Music_player | Pedometer; Call; kakao_talk |
| 1207 | Staying | – | Home | E-book | E-mail; Game(Crash Clen); kakao_talk |

METHOD OF USING USE LOG OF PORTABLE TERMINAL AND APPARATUS USING THE SAME

CROSS-REFERENCE TO RELATED APPLICATION(S)

This application claims the benefit under 35 U.S.C. §119 (e) of a U.S. Provisional application filed on May 10, 2013 in the U.S. Patent and Trademark Office and assigned Ser. No. 61/821,996, and under 35 U.S.C. §119(a) of a Korean patent application filed on Jul. 15, 2013 in the Korean Intellectual Property Office and assigned Serial number 10-2013-0082882, the entire disclosure of each of which is hereby incorporated by reference.

TECHNICAL FIELD

The present disclosure relates to a method and an apparatus for using a use log of a portable terminal collected by the portable terminal More particularly, the present disclosure relates to a method and an apparatus for using a use log related to a location to which a portable terminal has moved.

BACKGROUND

A portable terminal is able to determine its location in various ways. For example, a portable terminal can determine its location using a Cell Positioning System (CPS) scheme. Such a scheme is also called a Cell-ID scheme corresponding to a technology which collects a signal from a base station close to the portable terminal to measure the location. As another example, a portable terminal can determine its location using a Global Positioning System (GPS) scheme. Such a scheme is a technology which measures the location by using a GPS signal received from a satellite and may be more accurate as compared to the CPS scheme. As another example, a portable terminal can determine its location using a Wi-Fi Positioning System (WPS) scheme. Such a scheme is a technology which compares information of an Access Point (AP) received through Wi-Fi and information of a pre-stored AP to determine the location of the portable terminal. In addition, a portable terminal can measure and supplement its location information using a gravity sensor and an acceleration sensor included within the portable terminal.

However, the CPS scheme has a disadvantage in that an error margin of the location of the portable terminal is large. Further, when the location of the portable terminal is determined using the GPS scheme or the CPS scheme, or the gravity sensor and the acceleration sensor, additional power to operate a module related to the sensors may be consumed. Accordingly, a method of minimizing power consumption of the portable terminal and accurately measuring the location of the portable terminal is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of determining a current location of a portable terminal while minimizing power consumption by using a use log of the portable terminal that includes information on a location to which the portable terminal has moved.

Another aspect of the present disclosure is to use a use history model updated using the use log of the portable terminal to measure the current location of the portable terminal. Further, the present disclosure provides a method of providing information on another application related to an application being currently executed in the portable terminal by using the use log of the current portable terminal.

In accordance with an aspect of the present disclosure, a method of using a use log of a portable terminal is provided. The method includes providing a first application being executed, on a display unit, determining a second application related to the first application being executed, based on information collected in a previous context state identical or similar to a current context state of a user, providing an identifier of the determined second application, detecting a user input of selecting the identifier of the second application, and executing the second application in response to the detected user input.

The second application related to the first application may be an application which has been executed within a threshold time before or after the first application is executed in the previous context state identical or similar to the current context state of the user.

The second application related to the first application may be an application which has been executed a threshold number of times or more within a threshold time before or after the first application is executed.

The determining of the second application related to the first application being executed, based on the information collected in the previous context state identical or similar to the current context state of the user may include determining the second application related to the first application being executed, by using a statistic result generated by analyzing a use log collected in the previous context state identical or similar to the current context state of the user.

The context state may be one or more of a moving state in a specific place, a staying state in a specific place, a state of entering a specific place, a state of leaving a specific place, a state of going to work, a state of returning from work, a state of using a means of transportation, a user action state, and the like.

When the current context state of the user corresponds to a place where the user is currently located, the previous context state identical or similar to the current context state may correspond to a place identical to the place, a place within a threshold range from the place, a place having a name identical to that of the place, a place having a type identical to that of the place, and the like.

The determining of the second application related to the first application being executed may include additionally determining a third application related to the first application being executed and the providing of the identifier of the determined second application may include displaying an icon of the second application in response to a user input of performing a touch drag in a direction from one side of a touch screen to a center of the touch screen.

The method may further include providing information on the current context state of the user on a touch screen.

The determining of the second application related to the first application being executed, based on the information collected in the previous context state identical or similar to the current context state of the user, may include determining the current context state of the user by using information related to a location of the portable terminal and information related to a current time.

The information related to the location of the portable terminal may be an identifier representing a network area including the location of the portable terminal when power of the portable terminal is equal to or smaller than a threshold, and the information related to the location of the portable terminal may be at least one of a coordinate value of the location of the portable terminal and information on an Access Point (AP) connected to the portable terminal when the power of the portable terminal is larger than or equal to the threshold.

In accordance with another aspect of the present disclosure, a portable terminal using a use log is provided. The portable terminal includes a processor configured to determine a second application related to a first application being executed, based on information collected in a previous context state identical or similar to a current context state of a user, and to provide an identifier of the determined second application, a user input unit configured to detect an input of the user of selecting the identifier of the determined second application, and a display unit configured to display the second application in response to the detected input of the user.

The second application related to the first application may be an application which has been executed within a threshold time before or after the first application is executed in the previous context state identical or similar to the current context state of the user.

The second application related to the first application may be an application which has been executed a threshold number of times or more within a threshold time before or after the first application is executed.

The processor may determine the second application related to the first application being executed by using a statistic result generated by analyzing a use log collected in the previous context state identical or similar to the current context state of the user.

The context state may be one or more of a moving state in a specific place, a staying state in a specific place, a state of entering a specific place, a state of leaving a specific place, a state of going to work, a state of returning from work, a state of using a means of transportation, a user action state, and the like.

When the current context state of the user corresponds to a place where the user is currently located, the previous context state identical or similar to the current context state may correspond to a place identical to the place, a place within a threshold range from the place, a place having a name identical to that of the place, a place having a type identical to that of the place, and the like.

The processor may additionally determine a third application related to the first application being executed and the display unit may display an icon of the second application in response to a user input of performing a touch drag through the user input unit.

The display unit may display information on the current context state of the user.

The processor may determine the current context state of the user by using information related to a location of the portable terminal and information related to a current time.

The information related to the location of the portable terminal may be an identifier representing a network area including the location of the portable terminal when power of the portable terminal is equal to or smaller than a threshold, and the information related to the location of the portable terminal may be at least one of a coordinate value of the location of the portable terminal and information on an AP connected to the portable terminal when the power of the portable terminal is larger than or equal to the threshold.

In accordance with another aspect of the present disclosure, a method of using a use log of a portable terminal includes is provided. The method includes applying at least one network identifier representing at least one network area where the portable terminal is located and information related to a current time to a use log statistic model, determining a place where the portable terminal is located, the place having a smaller size than the network area as a result of the application, and controlling an application installed in the portable terminal by using a context state of a user in the place.

The applying of the information on the current time to the use log statistic model may include applying information related to a second time different from a first time corresponding to the current time to the use log statistic model, and the determining of the place where the portable terminal is located may include determining a second place different from a first place corresponding to the place where the portable terminal is located as a result of the application of the information related to the second time to the use log statistic model.

The place where the portable terminal is located may be at least one of a coordinate value of a location of the portable terminal, a building name or a building identifier of the location of the portable terminal, a street name or a street identifier of the location of the portable terminal, and the like.

The context state of the user in the place may be at least one of a moving state in the place, a staying state in the place, a state of entering the place, a state of leaving the place, and the like.

The use log statistic model may be updated using a network identifier periodically obtained by the portable terminal at each time.

The controlling of the application installed in the portable terminal by using the context state of the user in the place may include executing the application installed in the portable terminal executed in a previous context state identical or similar to the context state of the user.

The controlling of the application installed in the portable terminal by using the context state of the user in the place may include executing the application installed in the portable terminal, which is different from the application being currently executed in the portable terminal by using the context state of the user in the place.

The controlling of the application installed in the portable terminal by using the context state of the user in the place may include obtaining life pattern information of the user, and determining the context state of the user in the place by using the obtained life pattern information of the user.

The determining of the place where the portable terminal is located may further include obtaining a coordinate value of the location of the portable terminal by operating a location information unit of the portable terminal in a particular condition, and determining the place where the portable terminal is located based on the obtained coordinate value.

The particular condition may correspond to a case where power of the portable terminal is larger than or equal to a threshold.

In accordance with another aspect of the present disclosure, a portable terminal using a use log is provided. The portable terminal includes a memory configured to maintain a use log statistic model, a processor configured to apply at least one network identifier representing at least one network area where the portable terminal is located and information related to a current time to the use log statistic mode to determine a place where the portable terminal is located as a result of the application, the place having a smaller size than the network area, and to control an application installed in the portable terminal by using a context state of a user in the place, and a display unit configured to display a result of the control of the application.

The processor may apply information related to a second time different from a first time corresponding to the current time to the use log statistic model and determine a second place different from a first place corresponding to the place where the portable terminal is located as a result of the application of the information related to the second time to the use log statistic model.

The place where the portable terminal is located may be at least one of a coordinate value of a location of the portable terminal, a building name or a building identifier of the location of the portable terminal, a street name or a street identifier of the location of the portable terminal, and the like.

The context state of the user in the place may be at least one of a moving state in the place, a staying state in the place, a state of entering the place, a state of leaving the place, and the like.

The use log statistic model may be updated using a network identifier periodically obtained by the portable terminal at each time.

When the application installed in the portable terminal is controlled using the context state of the user in the place, the processor may execute the application installed in the portable terminal executed in a previous context state identical or similar to the context state of the user.

The processor may control the application installed in the portable terminal by using the context state of the user in the place.

The processor may execute the application installed in the portable terminal, which is different from the application being currently executed in the portable terminal by using the context state of the user in the place.

The processor may obtain life pattern information of the user and determine the context state of the user in the place by using the obtained life pattern information of the user.

The processor may obtain a coordinate value of the location of the portable terminal by operating a location information unit of the portable terminal in a particular condition and may determine the place where the portable terminal is located based on the obtained coordinate value.

The particular condition corresponds to a case where power of the portable terminal is larger than or equal to a threshold.

According to the present disclosure, a second application having a high correlation with a first application is recommended while the first application is executed, so that the inconvenience of newly searching an application can be reduced. To this end, the accuracy of the recommendation of the second application having the high correlation with the first application may be improved by analyzing at least one of a correlation between execution time of the first and second applications, a correlation between use recording of the first and second applications, and a correlation between the first and second applications and other areas (for example, media, web, communication target, and physical state). Further, by selectively analyzing the correlation in consideration of available power and resources of the portable terminal, power consumption and deterioration of service responsibility of the portable terminal can be minimized. That is, through the present disclosure, it is possible to further improve satisfaction of the user who uses a Location Based Service (LBS), a Social Networking Service (SNS), a user customized service, and the like.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a flowchart illustrating an operation recommending a new application based on a use log of a portable terminal according to an embodiment of the present disclosure;

FIG. 11 illustrates an example of a use log format stored in a use log DataBase (DB) of a memory according to an embodiment of the present disclosure; and FIG. 12 illustrates an example of a use log statistic result obtained using a use log statistic model according to an embodiment of the present disclosure.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, methods described in relation to a flowchart may be altered by changing an order of operations illustrated in the flowchart, or repeating or omitting a specific operation.

Hereinafter, embodiments of the present disclosure will be described with reference to the accompanying drawings.

Figure 1:
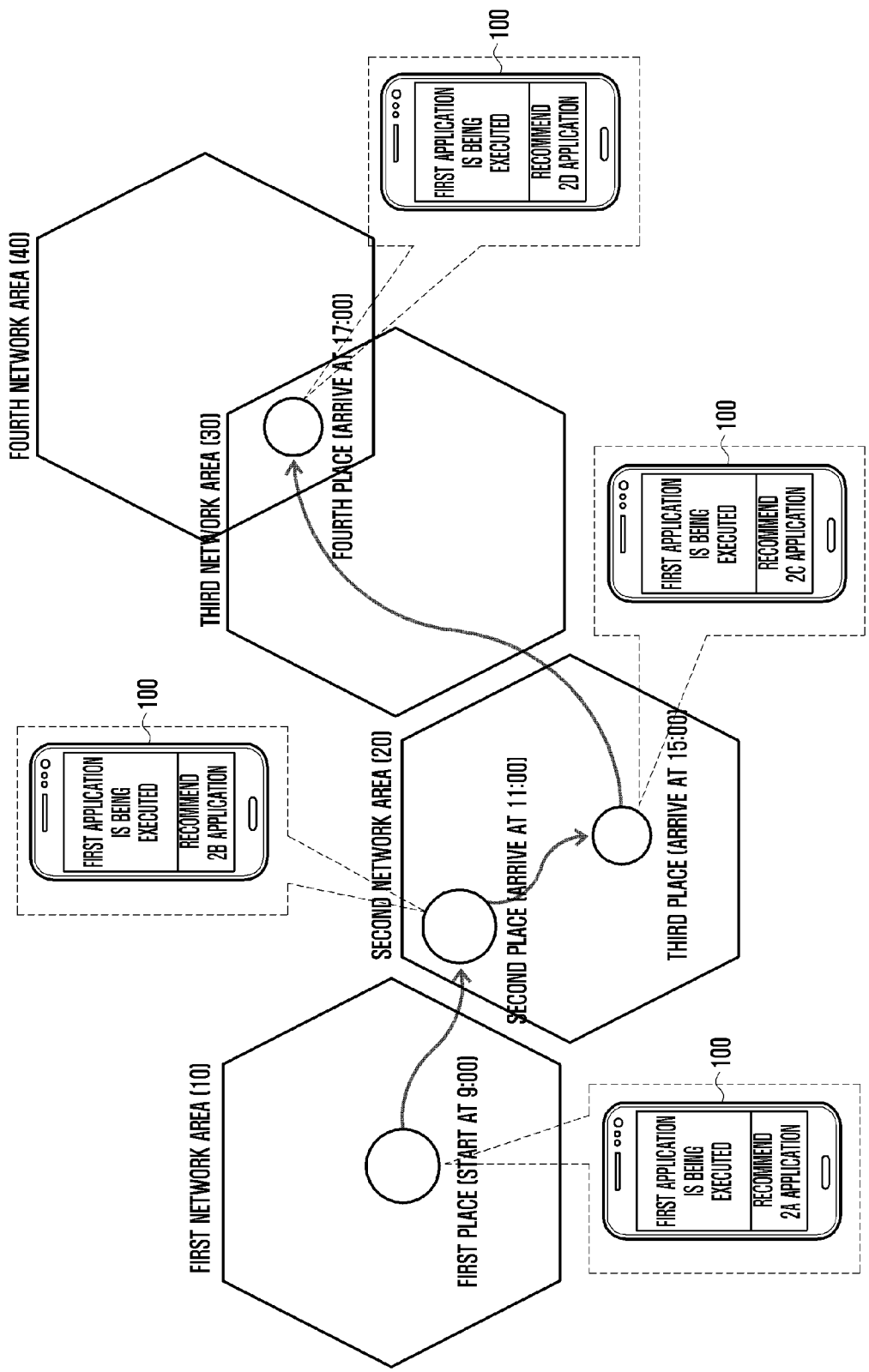
FIG. 1 illustrates an example of recommending a different application according to a location of a portable terminal according to an embodiment of the present disclosure.

FIG. 1 illustrates an example of recommending a different application according to a place of a portable terminal according to an embodiment of the present disclosure.

Referring to FIG. 1, a portable terminal 100 may start at a first time (for example, nine in the morning) in a first place of a first network area 10. A user may execute a first application in the first place. At this time, when the user makes a request for an application recommendation, the portable terminal 100 may recommend a 2A application in consideration of information on the first application being executed, information on the first place, and the first time. Further, when the user makes a request for execution of the 2A application, the portable terminal 100 may execute the 2A application.

Next, the portable terminal 100 may arrive in a second place of a second network area 20 at a second time (for example, eleven o'clock). The user may execute the first application in the same place as the first place. At this time, when the user makes a request for an application recommendation, the portable terminal 100 may recommend a 2B application different from the 2A application in consideration of information on the first application being executed, information on the second place, and the second time. Further, when the user makes a request for execution of the 2B application, the portable terminal 100 may execute the 2B application.

In a similar way, the portable terminal 100 may arrive in a third place of the second network area 20 and a fourth place corresponding to a common area of a third network area 30 and a fourth network area 40 at a third time and a fourth time, respectively. The portable terminal 100 may receive a request for a recommendation of the second application related to the first application being executed by the user in the third and fourth places where the portable terminal 100 has arrived. In this case, the portable terminal 100 may recommend 2C and 2D applications different from each other in consideration of the respective arrival places and arrival times. Further, when the user makes a request for execution of the recommended application, the portable terminal 100 may execute each of the 2C and 2D applications.

Figure 2:
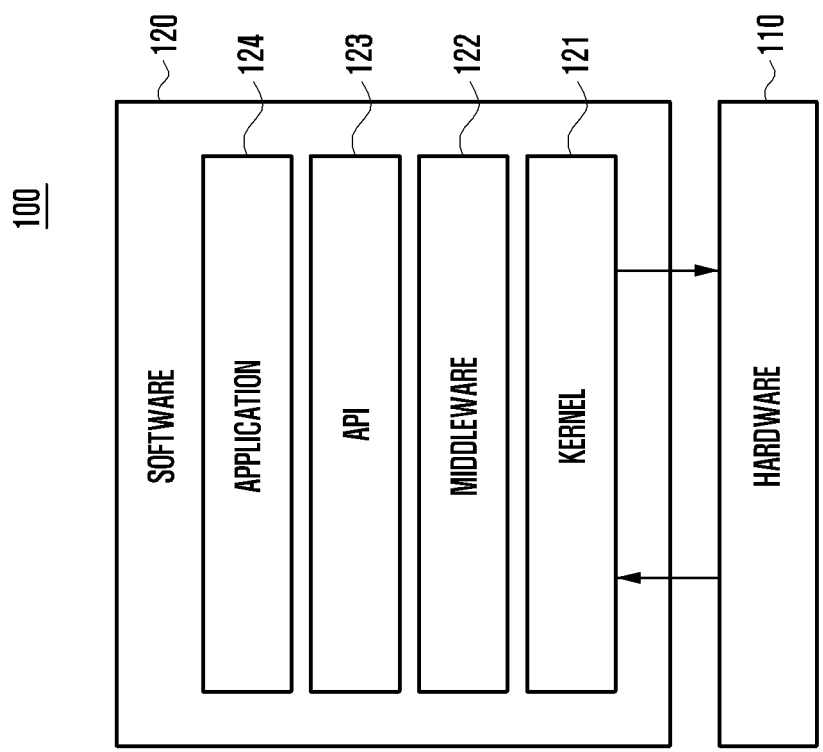
FIG. 2 is a block diagram illustrating components of a portable terminal according to an embodiment of the present disclosure.

FIG. 2 is a block diagram illustrating components of a portable terminal according to an embodiment of the present disclosure.

Referring to FIG. 2, the portable terminal 100 may include hardware 110 and software 120. The software 120 may include a kernel 121, middleware 122, an Application Programming Interface (API) 123, and an application 124. Examples of components of the hardware 110 and the software 120 will be described in more detail with reference to FIG. 3 and FIG. 4.

The components of the portable terminal 100 according to the present disclosure may be applied to a smart phone such as a Galaxy S or an iPhone, but are not limited thereto and may be applied to various devices. For example, the components of the portable terminal 100 may be applied to a tablet device such as a Galaxy Tab, an iPad, or the like, a Portable Multimedia Player (MPM), a Personal Digital Assistant (PDA), a laptop Personal Computer (PC), a wrist watch, a Head-Mounted Display (HMD), and a wearable device.

Figure 3:
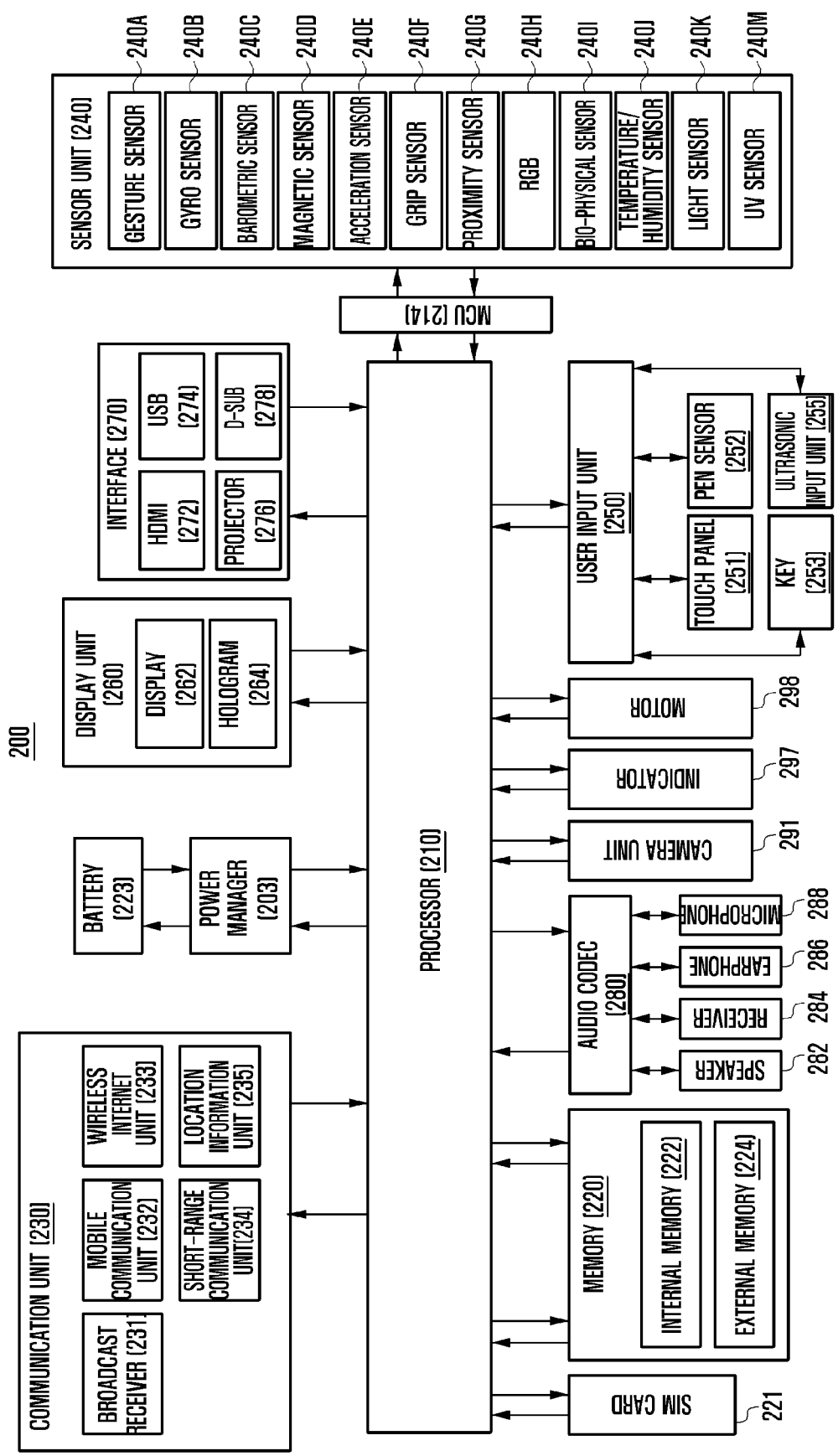
FIG. 3 is a block diagram illustrating hardware components of a portable terminal according to an embodiment of the present disclosure.

FIG. 3 is a block diagram illustrating hardware components of a portable terminal according to an embodiment of the present disclosure.

Referring to FIG. 3, the components of the hardware 200 of FIG. 3 may include one or more processors 210.

The processor 210 may control a plurality of hardware and software components connected to the processor 210 by driving an operating system and an application program and may operate as the processor 210 for processing various types of data including multimedia data and performing calculations. The processor 210 may be implemented by a System on Chip (SoC) and may further include a Graphic Processing Unit (GPU).

Further, the processor 210 may perform a communication function. For example, the processor 210 may distinguish and authenticate the portable terminal 200 within a network by using a subscriber identification module such as a Subscriber Identification Module (SIM) card 221 and may provide services, such as a voice call, a video call, a Short Message Service (SMS) message, packet data and the like, to the user. The processor 210 may include parts such as a power manager 203 or an internal memory 222.

A memory 220 may include at least one of the internal memory 222 and an external memory 224.

The internal memory 222 may include at least one of a volatile memory (for example, Dynamic Random Access Memory (DRAM), Static RAM (SRAM), a Synchronous Dynamic RAM (SDRAM) and the like) and a nonvolatile memory (for example, One Time Programmable Read Only Memory (OTPROM), Programmable ROM (PROM), Erasable and Programmable ROM (EPROM), Electrically Erasable and Programmable ROM (EEPROM), a mask ROM, a flash ROM and the like). According to an embodiment, the processor 210 may load a command or data received from at least one of the nonvolatile memory and another component in the volatile memory and process the loaded command or data. Further, the processor 210 may store data received or generated from another component in the nonvolatile memory.

The external memory 224 may include at least one of, for example, a Compact Flash (CF), a Secure Digital (SD), a Micro Secure Digital (Micro-SD), a Mini Secure Digital (Mini-SD), an extreme Digital (xD), and a memory stick.

The power manager 203 may manage or monitor power of the hardware 200. Although not illustrated, the power manager 203 may include, for example, a Power Management Integrated Circuit (PMIC), a charger Integrated Circuit (IC), or a battery gauge. The PMIC may be mounted within, for example, an integrated circuit or an SoC semiconductor. Charging methods may be classified into a wired charging method and a wireless charging method. The charger IC may charge a battery and prevent over voltage or over current from flowing from a charger. At this time, the charger IC may operate in at least one of the wired charging method and the wireless charging method. The wireless charging method may include, for example, a resonant type, an electromagnetic inductive type, and an electromagnetic wave type. In this case, an additional circuit for wireless charging, for example, a coil loop, a resonance circuit, a rectifier, or the like may be included. The battery gauge may measure at least one of a residual quantity of a battery 223, and a voltage, a current, or a temperature during the charging. The battery 223 may generate electricity to supply power and may be, for example, a rechargeable battery.

An interface unit 270 may include at least one of an HDMI 272, a Universal Serial Bus (USB) 274, a projector 276, a D-subminiature (D-sub) 278, a Secure Digital (SD)/Multi-Media Card (MMC) (not shown), and an Infrared Data Association (IrDA) (not shown).

A communication unit 230 may include at least one of a broadcast receiver 231, a mobile communication unit 232, a wireless Internet unit 233, a short-range communication unit 234, and a location information unit 235. The broadcast receiver 231 receives a broadcast signal and/or broadcast related information from an external broadcast management server through a broadcast channel. The broadcast channel may include a satellite channel and a terrestrial channel. The broadcast management server may refer to a server that generates and transmits a broadcast signal and/or broadcast related information or a server that receives a pre-generated broadcast signal and/or broadcast related information and transmits the generated broadcast signal and broadcast related information to the terminal. The broadcast signal may include not only a TV broadcast signal, a radio broadcast signal and a data broadcast signal but also a broadcast signal in the form of a combination of a TV broadcast signal or a radio broadcast signal with a data broadcast signal. The broadcast related information may refer to information related to a broadcast channel, a broadcast program, or a broadcast service provider. The broadcast related information may be provided through a mobile communication network. In this case, the broadcast related information may be received by a mobile communication unit 232. The broadcast related information may exist in various forms. For example, the broadcast related information may be in a form such as an Electronic Program Guide (EPG) of Digital Multimedia Broadcasting (DMB) or an Electronic Service Guide (ESG) of a Digital Video Broadcast-Handheld (DVB-H). The broadcast receiver 231 may receive a broadcast signal by using various broadcast systems, and particularly, may receive a digital broadcast signal by using digital broadcast systems such as Digital Multimedia Broadcasting-Terrestrial (DMB-T), Digital Multimedia Broadcasting-Satellite (DMB-S), Media Forward Only (MediaFLO), Digital Video Broadcast-Handheld (DVB-H), Integrated Services Digital Broadcast-Terrestrial (ISDB-T), and the like. Of course, the broadcast receiver 231 may be configured to be suitable for not only the above described digital broadcast systems but also other broadcast systems. The broadcast signal and/or the broadcast related information received through the broadcast receiver 231 may be stored in the memory 220.

The mobile communication unit 232 may transmit/receive a wireless signal to/from at least one of a base station, an external terminal, and a server over the mobile communication network. The wireless signal may include data in various forms according to transmission/reception of a voice call signal, a video call signal, an SMS/multimedia message.

The wireless Internet unit 233 performs a function for an access to a wireless Internet. Use may be made of wireless Internet technologies, such as Wireless Local Area Network (WLAN), Wi-Fi, Wireless broadband (Wibro), World Interoperability for Microwave Access (Wimax), High Speed Downlink Packet Access (HSDPA), and the like.

The short-range communication unit 234 may perform a function for short-range communication. Use may be made of short-range technologies, such as Bluetooth, Radio Frequency IDentification (RFID), Infrared Data Association (IrDA), Ultra WideBand (UWB), ZigBee, and the like.

The location information unit 235 performs a function for obtaining or identifying a location of a mobile terminal. The location information unit 235 may obtain location information by using a Global Navigation Satellite System (GNSS). GNSS is a term used for describing wireless navigation satellite systems in which predetermined types of wireless navigation transceivers rotate around the earth and transmit reference signals for determining the earth's surface or locations of the wireless navigation receivers near the earth's surface. GNSS includes Global Positioning System (GPS) operated by the USA, Galileo operated by the European Union, Global Orbiting Navigational Satellite System (GLONASS) operated by Russia, COMPASS operated by China, Quasi-Zenith Satellite System (QZSS) operated by Japan, and the like.

Additionally or generally, the communication unit 230 may include a network interface (for example, LAN card) or a modem for connecting the hardware 200 with a network (for example, Internet, Local Area Network (LAN), Wire Area Network (WAN), telecommunication network, cellular network, satellite network or Plain Old Telephone Service (POTS).

A user input unit 250 may receive various commands from the user. The user input unit 250 may include at least one of, for example, a touch panel 251, a (digital) pen sensor 252, a key 253, and an ultrasonic input unit 255.

The touch panel 251 may recognize a touch input by the user based on, for example, at least one of a capacitive type, a resistive type, an infrared type, and an acoustic wave type. The touch panel 251 may further include a controller (not shown). Meanwhile, in the capacitive type, a proximity recognition is possible as well as a direction touch. The touch panel 251 may further include a tactile layer. In this case, the touch panel 251 may provide a user with a tactile reaction. The (digital) pen sensor 252 may be implemented, for example, using a separate recognition sheet in the same way as a method of receiving a touch input of the user. As the key 253, for example, a key pad or a touch key may be used. The ultrasonic input unit 255 may detect an acoustic wave received by a microphone 288 through a pen generating an acoustic signal to identify data. According to various embodiments, the hardware 200 may receive a user input from an external device (for example, a network, a computer, a server, and the like) located outside the portable terminal 100 by using, for example, the communication unit 230.

A display unit 260 is a device for displaying an image or data to the user, and may include, for example, a display panel 262 and a hologram unit 264 for showing a stereoscopic image on the air by using interference of light. As the display panel 262, for example, a Liquid Crystal Display (LCD) or an Active Matrix Organic Light Emitting Diode (AM-OLED) may be used. At this time, the display unit 260 may further include a controller for controlling the display panel 262. The display panel 262 may be implemented to be, for example, flexible, transparent, or wearable. Meanwhile, the display panel 262 may be configured as one unit with the touch panel 251 and provided in the form of a touch screen.

A camera unit 291 may perform a function of photographing an image such as a dynamic image. The camera unit 291 may include one or more image sensors (for example, a front lens or a back lens) (not shown), an Image Signal Processor (ISP) (not shown), or a flash LED (not shown) according to an implementation.

A timer 297 may perform a function of providing information on a specific time. For example, the timer may determine a current time by using a reference time obtained from an internal reference watch or the communication unit 230 and provide information on the current time when the processor 210 makes a request for the information.

A motor 298 may perform a function of converting an electrical signal to a mechanical vibration.

A sensor unit 240 may include, for example, a gesture sensor 240A, a gyro sensor 240B, a barometer sensor 240C, a magnetic sensor 240D, an acceleration sensor 240E, a grip sensor 240F, a proximity sensor 240G, a Red, Greed, and Blue (RGB) sensor 240H, a biometric sensor 240I, a temperature/humidity sensor 240J, an illuminance sensor 240K, an UltraViolet (UV) sensor 240M, an E-nose sensor (not shown), an Electromyography (EMG) sensor (not shown), an Electroencephalogram (EEG) sensor (not shown), an Electrocardiogram (ECG) sensor (not shown) or a finger print sensor. According to an implementation embodiment, the hardware 200 may further include a Micro Controller Unit (MCU) 214 for controlling the sensor unit 240.

An audio codec unit 280 may bi-directionally convert a voice and an electrical signal. The audio codec unit 280 may convert voice information input or output through, for example, a speaker 282, a receiver 284, an earphone 286, the microphone 288 or the like. Names of the components of the hardware 200 may be changed. Further, the hardware 200 according to the present disclosure may include at least one of the above described components, omit one of the components, or further include an additional component.

Figure 4:
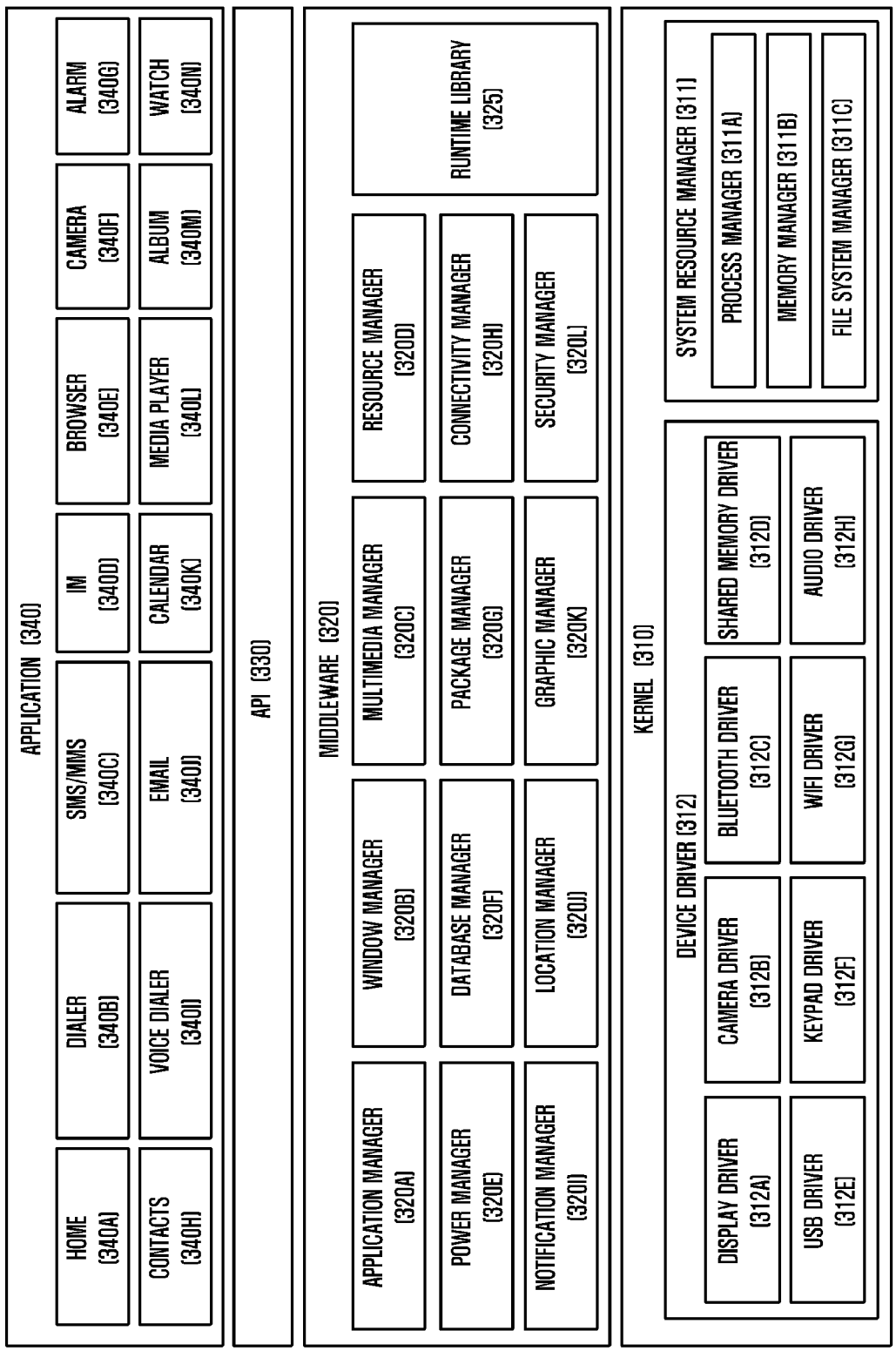
FIG. 4 is a block diagram illustrating software components of a portable terminal according to an embodiment of the present disclosure.

FIG. 4 is a block diagram illustrating software components of a portable terminal according to an embodiment of the present disclosure.

Referring to FIG. 4, the software 300 may include an Operating System (OS) implemented in the hardware 200 to control resources of the portable terminal 100 and an application 340 driven on the OS. The OS may include at least a part of a kernel 310, middleware 320, an API 330, and the application 340. As the OS, for example, Android, iOS, Windows, Symbian, Tizen, Bada, or the like may be used.

The kernel 310 may include a system resource manager 311 that can manage resources and a device driver 312. The system resource manager 311 may include, for example, a processor manager 311A, a memory manager 311B, or a file system manager 311C and may perform a function of controlling, allocating, or withdrawing system resources.

The device driver 312 may control various components of the hardware 200 of the portable terminal 100 by approaching the components in software. To this end, although not illustrated, the device driver 312 may be divided into, for example, an interface and an individual driver module part provided by each hardware company. For example, the device driver 312 may include at least one of a display driver 312A, a camera driver 312B, a Bluetooth driver 312C, a shared memory driver 312D, a USB driver 312E, a keypad driver 312F, a Wi-Fi driver 312G, an audio driver 312H, and an Inter-Process Communication (IPC) driver (not shown).

The middleware 320 may include a plurality of modules implemented in advance to provide functions commonly required for various applications. The middleware 320 may provide the commonly required functions through the API 330 such that the application 340 can efficiently use restricted system resources within the electronic device. The middleware 320 may include one or more of a plurality of modules, for example, an application manager 320A, a window manager 320B, a multimedia manager 320C, a resource manager 320D, a power manager 320E, a database manager 320F, and a package manager 320G.

The application manager 320A may manage a life cycle of at least one of the applications 340. The window manager 320B may manage Graphical User Interface (GUI) resources used by a screen. The multimedia manager 320C may grasp formats required for reproduction of various media files, and may perform an encoding or a decoding of the media file by using a codec suitable for the corresponding format. The resource manager 320 may manage resources such as a source code of at least one of the applications 340, a memory, and a storage space. The power manager 320E may operate together with a Basic Input/Output System (BIOS) to manage a battery or power and may provide power information required for the operation. The database manager 320F may manage generation, search, or change of a database to be used by at least one of the applications 340. The package manager 320G may manage an installation or an update of an application distributed in the form of a package file.

According to an implementation, the middleware 320 may include at least one of a connectivity manager 320H, a notification manager 320I, a location manager 320J, a graphic manager 320K, and a security manager 320L.

The connectivity manager 320H may manage, for example, a wireless connection such as Wi-Fi or Bluetooth. The notification manager 320I may display or make a notification of an event such as an arrival message, a scheduled date, proximity notification, and the like in such a way that a user is not disturbed. The location manager 320J may manage location information of the portable terminal 100. The graphic manager 320K may manage a graphic effect which will be provided to the user and a user interface related to the graphic effect. The security manager 320L may provide all security functions required for system security or user authentication. In addition, when the portable terminal 100 has a telephony function, the middleware 320 may further include a telephony manager (not shown) for managing a voice call function or a video call function.

The middleware 320 may include a runtime library 325 or other library modules (not shown) according to an implementation. The runtime library 325 is a library module that a compiler uses in order to add a new function through a programming language while an application is being executed. For example, the runtime library 325 may execute input and output, management of a memory, a function associated with an arithmetic function or the like. The middleware 320 may generate a new middleware module through a combination of various functions of the aforementioned internal component modules and use the generated new middleware module. Meanwhile, the middleware 320 may provide a module specified for each type of an operating system to provide a differentiated function.

The API 330 is a set of API programming functions, and may be provided with different configurations according to an operating system. For example, in Android or iOS, a single API set may be provided for each platform. In Tizen, two or more API sets may be provided.

The application 340 may refer to one or more application programs implemented in the portable terminal 100 by using the API 330. The application 340 may be classified into, for example, a preloaded application and a third party application. For example, the application 340 may include at least one of a home application 340A for returning to a home screen, a dialer application 340B, a Short Message Service (SMS)/Multimedia Message Service (MMS) application 340C, an Instant Message (IM) application 340D, a browser application 340E, a camera application 340F, an alarm application 340G, a contacts (or address book) application 340H, a voice dial application 340I, an email application 340J, a calendar application 340K, a media player 340L, an album application 340M, and a watch application 340N.

Names of the components of the software 300 may be changed. Further, the software 300 according to the present disclosure may include at least one of the above described components, omit a few of the components, or further include an additional component.

Figure 5:
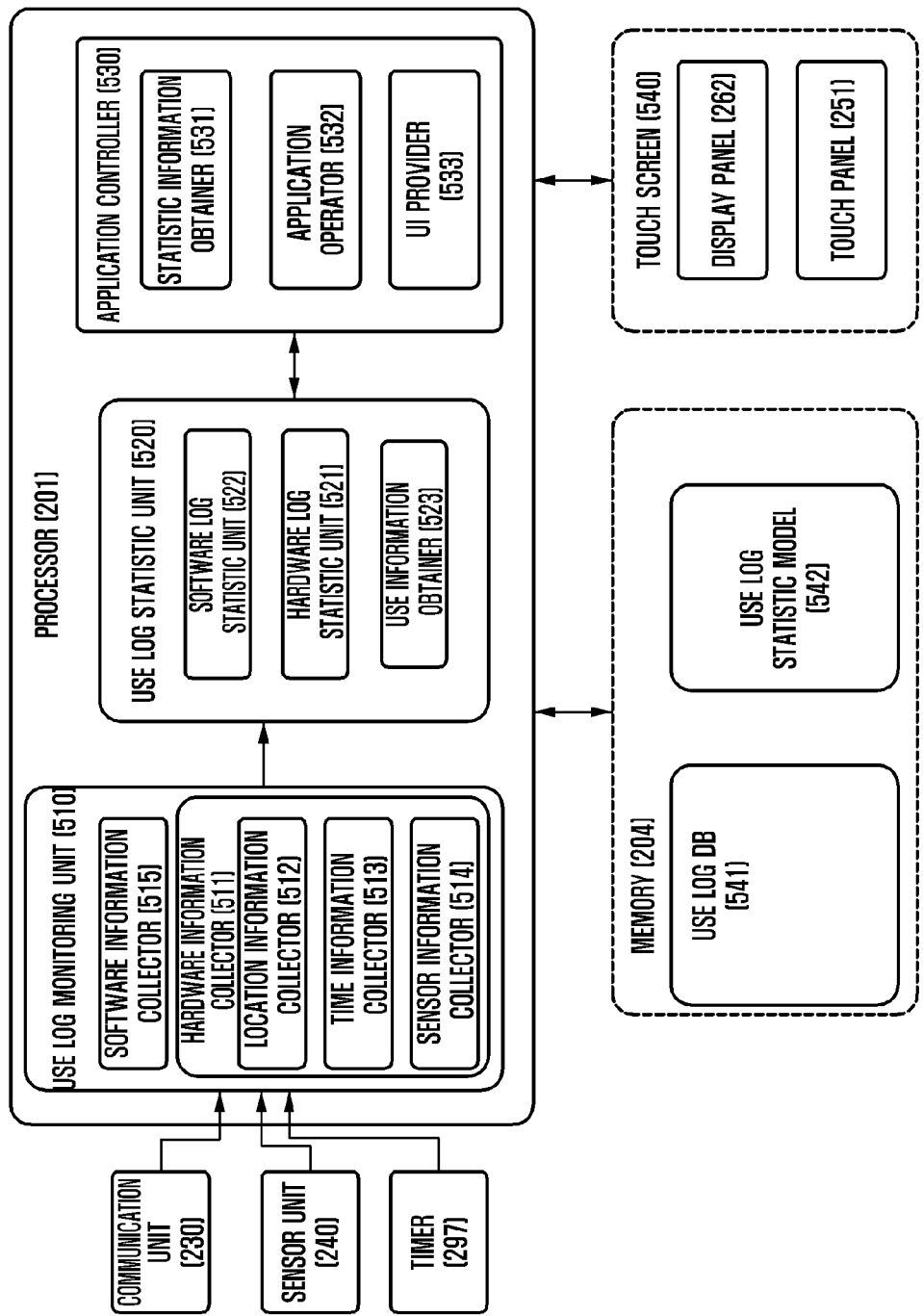
FIG. 5 is a block diagram illustrating components of a processor of a portable terminal according to an embodiment of the present disclosure.

FIG. 5 is a block diagram illustrating components of a processor of a portable terminal according to an embodiment of the present disclosure.

Referring to FIG. 5, the processor 210 of the portable terminal 100 may include a use log monitoring unit 510, a use log statistic unit 520, and an application controller 530.

The use log monitoring unit 510 may include a hardware information collector 511 for collecting hardware use information of the portable terminal 100 and a software information collector 515 for collecting software use information.

The hardware information collector 511 may include a location information collector 512, a time information collector 513, and a sensor information collector 514. The location information collector 512 may collect location information from the communication unit 230. The location information may be, for example, a cell-ID value which is an identifier of a network area obtained from the mobile communication unit 232 of the communication unit 230. Alternatively, the location information may be a GPS coordinate value including latitude and longitude information obtained from the location information unit 235 of the communication unit 230. Alternatively, the location information may be Access Point (AP) information obtained from the wireless Internet unit 233 of the communication unit 230.

The time information collector 513 may obtain information on a specific time from the timer 297. The information on the specific time may be obtained when an event making a request for a specific time by the processor 210 or when location information of the portable terminal 100 is collected by the location information collector 512. The information on the specific time may be one or more values of, for example, a month, a day, an hour, a day of the week, a minute, and a second.

The sensor information collector 514 may obtain one or more sensor values from the sensor unit 240. The sensor information collector 514 may obtain sensor values from the magnetic sensor, the acceleration sensor 240E, and the proximity sensor 240G and correct a distance or an altitude of location information by using the obtained sensor values. Alternatively, the sensor information collector 514 may predict an action state of the user by using the obtained sensor value. For example, the sensor information collector 514 may predict whether the action state of the user is a walking state, a running state, a sitting state, a standing state, or the like.

The software information collector 515 may collect use information generated when the user uses an application. For example, the software information collector 515 may collect information on a time when the application is executed, a time duration for which the application is used, a name of the application, and information on a content executed through the application.

The use log monitoring unit 510 may store the use information collected from the hardware information collector 511 and the software information collector 515 in a use log DB 541 of the memory 220.

FIG. 11 illustrates an example of a use log format stored in a use log DB of a memory according to an embodiment of the present disclosure.

Referring to FIG. 11, the use log format may include the type of use log, a data type of each use log, and a description of the use log. The type of use log may include, for example, TIMESTAMP_UTC (time according to a UTC scheme when the use log is recorded), TIMESTAMP_WT (time according to a WT scheme when the use log is recorded), CATEGORY (category list of an application), TYPE (application type), LAUNCH_TYPE (application execution type), START_TIME (execution time of an application), STOP_TIME (time when an application is moved to a foreground or when the application ends), DURATION (time for which an application is used), PLACE_ID (identifier of a place where the portable terminal is located), PLACE_NAME (name of an identifier of a place where the portable terminal is located), PLACE_CATEGORY (category of the place), LONGITUDE (longitude of the user when a call starts), LATITUDE (latitude of the user when a call starts), APP_ID (application identifier), and APP_SUB_ID (class name of an application) The expression "*" means that the value has a plurality of values.

Further, the use information collected from the hardware information collector 511 and the software information collector 515 is not limited to the above described use log types and may have various types. For example, the portable terminal 100 may collect location information used by applications using location information such as Map, LBS, SNS, PIMS (contact, calendar and the like), and Web Browser and store collected various types of information in the use log DB 541.

The use log statistic unit 520 may include a hardware log statistic unit 521, a software log statistic unit 522, and a use information obtainer 523. The use information obtainer 523 may obtain use information of the current portable terminal 100 from the use log monitoring unit 510 or obtain the use log corresponding to histories of the use information of the portable terminal 100 from the use log DB 541. Alternatively, the use log obtainer 523 may inquire of the user about a current context state of the user using the portable terminal 100 through a UI provider 533 of the application and obtain a response to the inquiry. The hardware log statistic unit 522 may determine a current place of the potable terminal and a context state of the user in the place by using the use information or the use log obtained from the use information obtainer 523. For example, the hardware log statistic unit 522 may obtain identification information of the network where the portable terminal is currently located and current time information and determine a place where the potable terminal is currently located and a context state of the user in the place based on the use log related to the obtained information. The software log statistic unit 522 may determine a second application related to a first application, which is being currently executed, by using the use information or the use log obtained from the use information obtainer 523. For example, the software log statistic unit 522 may obtain information on the first application being executed and the current context state of the user and determine the second application related to the first application being executed, based on a use log collected in a previous context state identifier or similar to the current context state of the user.

When the use log statistic unit 520 determines the context state of the user, the use log statistic unit 520 may determine the context state of the user based on a statistic result generated by applying the use information or the use log to a use log statistic model 542.

The use log statistic model 542 may be a model operating through a machine learning algorithm. The use log statistic model 542 may be continuously updated using network information periodically obtained by the portable terminal 100 at each time. The machine learning algorithm used by the use log statistic model 542 is an algorithm that teaches about a model by using collected data and then makes a machine answer a new question and may include a Bayes classifier algorithm, a K-means algorithm, a Support Vector Machine (SVM) algorithm, a boosting algorithm, a decision tree algorithm, a random tree algorithm, an Expectation-Maximization (EM) algorithm, a neural network algorithm, and the like. Further, two or more of the algorithms may be combined and used for the use log statistic model 542 or the machine learning algorithm and a different statistic algorithm are combined and used for the use log statistic model 542.

The use log statistic unit 520 may provide a statistic result of the use log obtained from the use log statistic model 542 to an application controller 530.

The application controller 530 may include a statistic information obtainer 531, an application operator 532, and a UI provider 533. The statistic information obtainer 531 may obtain a statistic result of the use log from the use log statistic unit 520. For example, the statistic information obtainer 531 may obtain, as the statistic result of the use log, a place where the user is currently located, a current context state of the user, information on the second application related to the first application being currently executed, and the like. Further, the statistic information obtainer 531 may provide the statistic result of the use log to the application operator 532 or the UI provider 533. The application operator 532 may automatically execute the second application based on the result obtained from the statistic information obtainer 531 or execute the second application in response to a request for executing the second application by the user. The place where the user is currently located or the current context state of the user may be provided through the display panel 262 of a touch screen 540 based on the result obtained from the statistic information obtainer 531. Alternatively, the UI provider 533 may provide a UI recommending the second application and obtain the request for executing the second application from the user through the touch panel 251. Alternatively, the UI provider 533 may make an inquiry to the user about the current context state of the user and obtain a response to the inquiry. Further, the UI provider 533 may provide information on the obtained response to the use log statistic unit 520.

Figure 6:
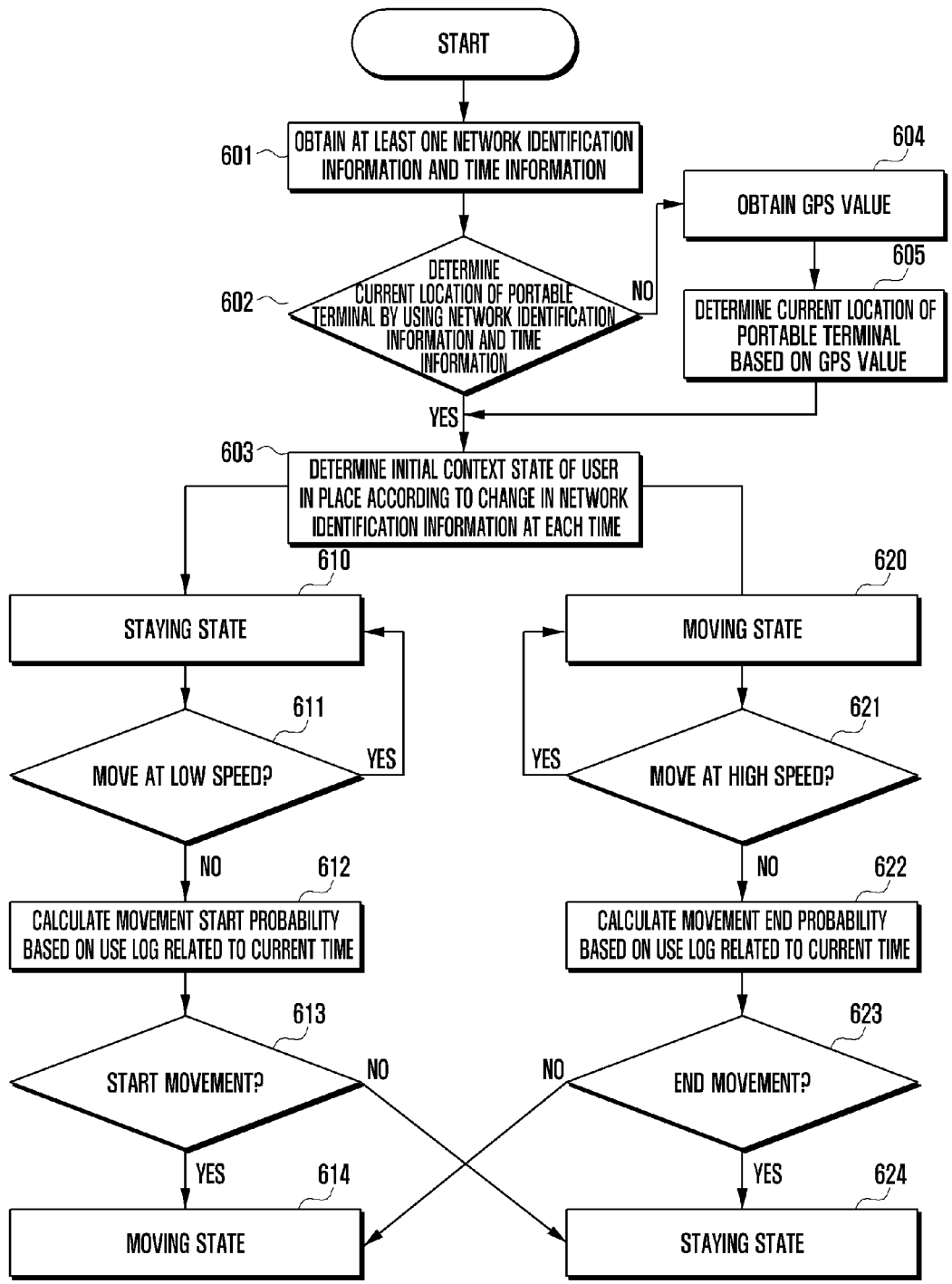
FIG. 6 is a flowchart illustrating an operation of determining a context state of a user by using a use log of a portable terminal according to an embodiment of the present disclosure.

FIG. 6 is a flowchart illustrating an operation of determining a context state of a user by using a use log of a portable terminal according to an embodiment of the present disclosure.

Referring to FIG. 6, the hardware log statistic unit 521 of the processor 210 may obtain a network identifier (for example, cell-ID) representing at least one network area where the portable terminal 100 is located and information on a current time (for example, at least one of month, day, day of the week, hour, minute, and second) in operation 601. Further, the hardware log statistic unit 521 may determine the place where the portable terminal 100 is currently located by applying the obtained at least one network identifier and the information related to the current time to the use log statistic model 542 in operation 602. At this time, a size of the place where the portable terminal 100 is located may be smaller than a size of the network area. For example, the place where the portable terminal 100 is located may include a coordinate value where the portable terminal 100 is located, a street name including the coordinate where the portable terminal 100 is located, a street identifier, a building name, a building identifier, or a name of the place where the portable terminal 100 is located. Next, the hardware log statistic unit 521 may obtain an initial context state of the user in the place based on a change in the network identifier at each time in operation 603.

Meanwhile, when the portable terminal 100 obtains at least one network identifier identical to the at least one network identifier or obtains the network identifier at a second time different from a first time corresponding to the current time, the hardware log statistic unit 521 may apply the at least one network identifier and information related to the second time to the use log statistic model 542. Further, the hardware log statistic unit 521 may determine a second place different from a first place corresponding to the place of the portable terminal 100 determined in operation 602 as a place where the portable terminal 100 is currently located. Next, the hardware log statistic unit 521 may obtain an initial context state of the user in the second place based on a change in the network identifier at each time.

When the place where the portable terminal 100 is currently located cannot be determined in operation 602, the portable terminal 100 may obtain a GPS coordinate value where the portable terminal 100 is located by operating the location information unit 235 of the portable terminal 100 in operation 604. Further, the portable terminal 100 may determine the place where the portable terminal 100 is currently located by using the obtained GPS coordinate value in operation 605.

Meanwhile, in another example, the portable terminal 100 may consider a condition of a power state of the portable terminal 100 while monitoring power of a battery by using the power manager 203 in order to determine the place where the portable terminal 100 is currently located.

For example, when power of the portable terminal 100 is equal to or smaller than a threshold (for example, only power equal to or below 10% remains), the portable terminal 100 may use an identifier representing a network area including the place where the portable terminal is located as information on the current location. In contrast, when the power of the portable terminal 100 is larger than or equal to a threshold (for example, power equal to or more than 10% remains), the portable terminal 100 may use the GPS coordinate value obtained by operating the location information unit 235 or use the AP information obtained by operating the wireless Internet unit 233 as the information on the current location.

In another example, the portable terminal 100 may consider a geographical state of the portable terminal 100 in order to determine the place where the portable terminal 100 is currently located. For example, the portable terminal 100 may use the identifier representing the network area in a place where the location information unit 235 is not operated and obtain the GPS value by operating the location information unit 235 in a place where the location information unit 235 is always operated, so as to determine the place where the portable terminal 100 is located.

The initial context state of the user may be, for example, a state indicating whether the user is in a staying state in a current place as illustrated in operation 610 or a moving state as illustrated in operation 620.

In an embodiment, when the initial state of the user is the staying state as illustrated in operation 610, the hardware log statistic unit 521 may determine whether the user moves at a low speed in operation 611. The hardware log statistic unit 521 may use a ratio of a time to a movement distance to determine whether the user moves at a low speed or a high speed. For example, the hardware log statistic unit 521 may calculate a movement distance from a coordinate value of a base station corresponding to a recent cell-ID and a coordinate value of a base station corresponding to a previous cell-ID based on a cell-ID value corresponding to network identification information and calculate a movement time during the movement distance, so as to calculate the ratio of the time to the movement distance as a movement speed of the user. Further, when the ratio is equal to or smaller than a threshold, the hardware log statistic unit 521 may determine that the movement speed of the user is the low speed. In contrast, when the ratio is larger than or equal to a threshold, the hardware log statistic unit 521 may determine that the movement speed of the user is the high speed.

When it is determined that the movement is taking place at a low speed, the hardware log statistic unit 521 may continuously determine the current context state of the user as the staying state as illustrated in operation 610. In contrast, when it is impossible to determine whether the movement is taking place at a low or high speed, the hardware log statistic unit 521 may calculate a movement start probability of the user based on a use log related to a current time in operation 612. For example, the hardware log statistic unit 521 may calculate the movement start probability of the current user based on a probability value at a past time related to the current time by using the use log statistic model 542. The use log statistic model 541 may calculate in advance the probability value at each time based on the use log of the portable terminal 100. For example, the use log statistic model 542 may calculate in advance conditional probabilities $Pr(Z|T)$, $Pr(A,\delta|Z \wedge T)$, and $Pr(A, \delta \rightarrow B|Z \wedge T)$ at a specific time T and day of the week. Thereafter, the use log statistic model 542 may calculate the movement start probability of the current user by using a probability value at the same day of the week and the same time as the current time and the current day of the week. Accordingly, the portable terminal 100 may determine the movement start probability of the user with the high accuracy even though the user has different movement patterns according to the time even in the same place.

According to a result of the calculation of the movement start probability, it may be determined whether the current context state of the user is a movement start state in operation 613. When it is determined that the context state of the user is the movement start state, the hardware log statistic unit 521 may determine the context state of the user as the moving state as illustrated in operation 614. In contrast, when it is determined that the context state of the user is not the movement start state, the hardware log statistic unit 521 may determine the context state of the user as the staying state as illustrated in operation 624.

In another embodiment, when the initial state of the user is the moving state as illustrated in operation 620, the hardware log statistic unit 521 may determine whether the user moves at a high speed in operation 621. When it is determined that the movement is taking place at a speed, the hardware log statistic unit 521 may continuously determine the current context state of the user as the moving state as illustrated in operation 620. In contrast, when it is impossible to determine whether the movement is taking place at a high speed, the hardware log statistic unit 521 may calculate a movement end probability of the user based on a use log related to a current time in operation 622. For example, the hardware log statistic unit 521 may calculate the movement end probability based on a probability value at a past time related to the current time. Further, the hardware log statistic unit 521 may determine whether the current context state of the user is a movement end state in operation 623. When it is determined that the context state of the user is the movement end state, the hardware log statistic unit 521 may determine the context state of the user as a staying state as illustrated in operation 624. In contrast, when it is determined that the context state of the user is not the movement end state, the hardware log statistic unit 521 may determine the context state of the user as the moving state as illustrated in operation 614.

Figure 7:
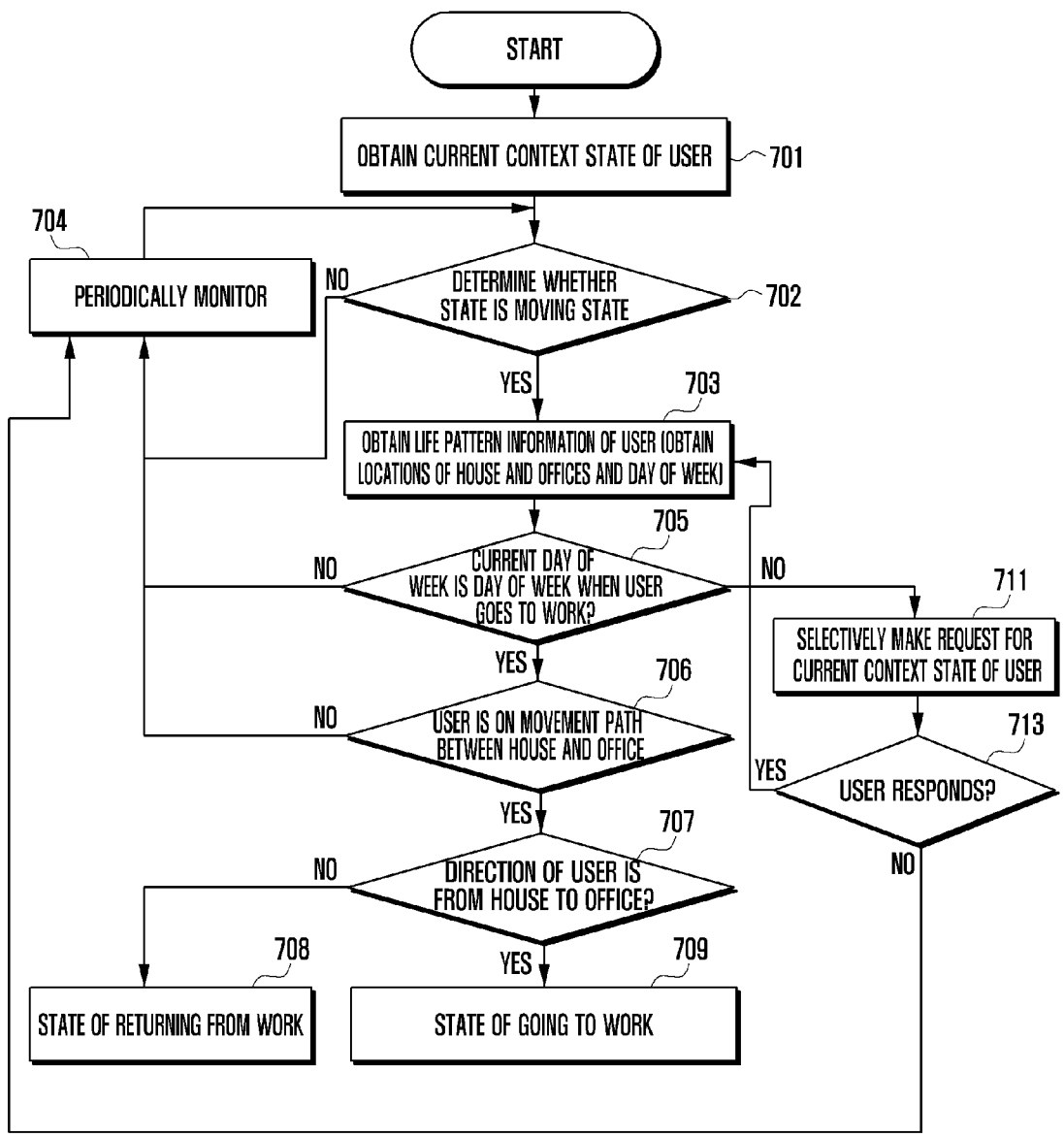
FIG. 7 is a flowchart illustrating an operation of determining a context state of a user by using a use log of a portable terminal according to an embodiment of the present disclosure.

FIG. 7 is a flowchart illustrating an operation of determining a context state of a user by using a use log of a portable terminal according to an embodiment of the present disclosure.

Referring to FIG. 7, the hardware log statistic unit 521 of the processor 210 may obtain a context state of the user in operation 701. At this time, a method of determining the context state of the user may be determined using the network identifier and the information related to the current time as described in FIG. 6. Next, the hardware log statistic unit 521 may determine whether the context state of the user is a moving state in operation 702. When the context state of the user is the moving state, the hardware log statistic unit 521 may obtain life pattern information of the user in operation 703. The life pattern information of the user may be, for example, information on a location of a house or an office of the user or information on days of the week when the user goes to work. When the context state of the user is not the moving state, the hardware log statistic unit 521 may periodically monitor whether the context state of the user is the moving state in operation 704.

Next, the hardware log statistic unit 521 may determine whether a current day of the week is the day of the week when the user goes to work in operation 705 by using current time information and life pattern information of the user. When the current day of the week is the day of the week when the user goes to work, the hardware log statistic unit 521 may determine whether the user is on a movement path between the house and the office in operation 706. In contrast, when the current day of the week is not the day of the week when the user goes to work or when the current day of the week is the day of the week when the user goes to work but the user is not on the movement path between the house and the office, the hardware log statistic unit 521 may periodically monitor until the context state of the user meets a condition in operation 704.

When the user is on the movement path between the house and the office, the hardware log statistic unit 521 may determine whether a movement direction of the user is a direction from the house to the office in operation 707. As a result of the determination, when the movement direction of the user is the direction from the house to the office, the hardware log statistic unit 521 may determine the context state of the user as a state of going to work as illustrated in operation 709. In contrast, when the movement direction of the user is a direction from the office to the house, the hardware log statistic unit 521 may determine the context state of the user as a state of returning from work as illustrated in operation 708.

Meanwhile, in operation 705, when the hardware log statistic unit 521 recognizes the state of the user as the state of going to work or returning from work even though the current day of the week is not the day of the week when the user goes to work, the hardware log statistic unit 521 may make a request for the current context state of the user through the UI provider 535 of the application controller 530 in operation 711. For example, the UI provider 533 may provide a UI that asks a question "Are you going to work today" to receive a response from the user. Then, when the UI provider 533 receives a response "Yes" or "No" from the user in operation 713, the UI provider 533 may provide the response by feedback related to the life pattern information of the user in operation 703. In contrast, when the UI provider 533 does not receive the response from the user, the hardware log statistic unit 521 may periodically continuously monitor the context state of the user in operation 704.

As described above, the context state of the user may have the moving state in a specific place, the staying state in a specific place, the state of going to work, and the state of returning from work, but is not limited to the above described embodiment of the present disclosure and may include various context states. For example, the context state of the user may include a state of entering a specific place, a state of leaving a specific place, a state of using a means of transportation, and a user action state (for example, a walking state, a running state, a sitting state, and a standing state). In each of the context states of the user, the portable terminal 100 may control an application suitable for each of the states and a configuration of the portable terminal 100.

For example, when the context state of the user is determined as a state of going to work, the portable terminal 100 may execute and display an application providing traffic information. Alternatively, when the context state of the user is determined as a state of staying at the office, the portable terminal 100 may configure a bell mode to a vibration mode. When the context state of the user is determined as the state of moving near the office, the portable terminal 100 may execute and display an application providing information on restaurants and cafes around the user.

FIG. 8 is a flowchart illustrating an operation of recommending a new application based on a use log of a portable terminal according to an embodiment of the present disclosure.

Referring to FIG. 8, the software log statistic unit 522 of the processor 210 may obtain a current context state of the user from the hardware log statistic unit 521 in operation 801. In an embodiment, a method of determining the context state of the user may use the methods described in FIGS. 6 and 7.

The software log statistic unit 522 may compare the obtained current context state of the user with a past context state of the user and determine whether the context state of the user has changed in operation 802. For example, the software log statistic unit 522 may determine whether a place where the portable terminal 100 is located has changed. When the place where the portable terminal 100 is located has changed, the software log statistic unit 522 may configure a different type of use log to be used, in order to recommend a new application according to a power state of the portable terminal 100. In contrast, when the place where the portable terminal 100 is located has not changed, the portable terminal 100 may continuously monitor whether the context state of the user is changed in operation 803.

When the context state of the user has changed and power of the portable terminal 100 lacks in operation 804, the software log statistic unit 522 may obtain a use log related to execution time of applications executed in a previous context state identical or similar to the current context state of the user in operation 805. For example, the software log statistic unit 522 may obtain a use log related to execution time of applications executed in a place identical to the current place of the user, a place within a threshold range from the current place of the user, a place having the same name as that of the place where the user is currently located (for example, a store having the same name or a bus having the same number), or the same type of place (for example, type of place is a store or type of place is a bus). Next, the software log statistic unit 522 may analyze the temporal proximity and the execution time context as the correlation between the execution time of the applications by applying the obtained use log to the use log statistic model 542 in operation 806.

Meanwhile, when the context state of the user has changed and power of the portable terminal 100 is sufficient in operation 807, the software log statistic unit 522 may obtain a use log of execution time of applications executed in a previous context state identical or similar to the current context state of the user and a use log of a content of an application executed only when the application is executed in operation 808. The use log of the content of the application may obtain, for example, media content information executed in the application, webpage information accessed using the application, a log of a server communicating through the application, and a log (for example, log of the sensor) of a physical state of the portable terminal 100 when using the application. The previous context state identical or similar to the current context state of the user may be a place identical to the current place of the user, a place within a threshold range from the current place of the user, a place having the same name as that of the place where the user is currently located, or a place having the same type. Next, the software log statistic unit 522 may analyze the correlation between the execution time of the applications and the correlation between contents by applying the obtained use log to the use log statistic model 542 in operation 809.

Subsequently, the software log statistic unit 522 may obtain identification information (for example, an ID representing the first application) of the first application being currently executed. Further, the software log statistic unit 522 may determine n number of second applications having the high correlation with the first application being currently executed, by applying the obtained identification information of the first application and results of the analyzed correlation to a conventionally known linear probabilistic model in operation 810. For example, the application log statistic unit 522 may sequentially determine the n number of second applications in an order from a second application having a high probability of being executed together with the first application while the first application is executed. At this time, the linear probability model generally operates as a part of the use log statistic model 542. In another embodiment, the linear probability model may operate as a separate module from the use log statistic model 542.

The second applications having a high probability of being executed while the first application is executed may be, for example, applications executed with a threshold time (for example, from 10 minutes before the first application is executed to 10 minutes after the application ends) before or after the first application is executed in a previous place identical or similar to the place where the user is currently located. Alternatively, the second applications having a high probability of being executed while the first application is executed may be applications which have been executed a threshold number of times or more (for example, three or more times) within a threshold time (for example, from 30 minutes before the first application is executed to 30 minutes after the first application ends) in a place identical or similar to the place where the user is currently located.

Next, the software log statistic unit 522 may provide identification information of the determined n number of second applications to the statistic information obtainer 531 of the application controller 530. The application controller 530 may determine whether the user makes a request for the second application in operation 811. For example, when the user performs a touch drag gesture in a direction from one side of the touch screen 540 to a center of the touch screen 540 in a state where the first application is executed, the application controller 530 may determine that the user makes a request for the second application. In this case, the application controller 530 may obtain identification information of the n number of second applications from the statistic information obtainer 531. Further, the obtained identifiers of the n number of second applications may be provided through the display panel 540 in operation 812. At this time, the identifiers of the second applications may be, for example, icons representing the second applications, respectively.

The application controller 530 may receive a signal of the user for selecting at least one second application from the provided icons of the second applications in operation 813. Further, the application controller 530 may execute the at least one selected second application as a response to the selection by the user in operation 814.

FIG. 12 illustrates an example of a use log statistic result obtained using a use log statistic model according to an embodiment of the present disclosure.

Referring to FIG. 12, the use log statistic model 542 may include second applications having the high correlation with the first application being executed according to a context state of the user. Referring to a reference numeral 1201, when the context state of the user is determined as a state where the user is in a bus to go to work, the use log statistic result may include second applications (for example, a Music app, an S-Note app, a ChatON app, etc.) having the high correlation with the first application (for example, a Facebook app, etc.) being currently executed by the user. Referring to a reference numeral 1202, when the context state of the user is determined as a state of returning from work, the use log statistic result may include second applications (for example, an E-book app, a Facebook app, a Web_browser app, a news.naver.com webpage, etc.) having the high correlation with the first application (for example, an E-mail app, etc.) being currently executed by the user. Referring to a reference numeral 1203, when the context state of the user is determined as a state where the user is shopping at Homeplus, the use log statistic result may include second applications (for example, a Wallet app, a Facebook app, a Web_browser app, a www.danawa.com webpage, etc.) having the high correlation with the first application (for example, a T_money app, etc.) being currently executed by the user. Referring to a reference numeral 1204, when the context state of the user is determined as a state where the user is driving his/her own car, the use log statistic result may include second applications (for example, a Call app, a Radio app, a Navigation app, etc.) having the high correlation with the first application (for example, a Youtube app, etc.) being currently executed by the user. Referring to a reference numeral 1205, when the context state of the user is determined as a state where the user is shopping in a bookstore, the use log statistic result may include second applications (for example, a Facebook app, a Web_browser app, a www.yes24.com, a T_Money app, etc.) having the high correlation with the first application (for example, an S-Note app) being currently executed by the user. Referring to a reference numeral 1206, when the context state of the user is determined as a state where the user is strolling on foot, the use log statistic result may include second applications (for example, a Pedometer app, a Call app, a Kakao_Talk app, etc.) having the high correlation with the first application (for example, a Music_player app, etc.) being currently executed by the user. Referring to a reference numeral 1207, when the context state of the user is determined as a state where the user is staying at home, the use log statistic result may include second applications (for example, an E-mail app, a Crash Clean game of a game app, a Kakao_Talk app, etc.) having the high correlation with the first application (for example, an E-book app, etc.) being currently executed by the user.

FIGS. 9A to 9E illustrate an example of recommending at least one second application while a first application is executed according to an embodiment of the present disclosure.

Figure 9A:
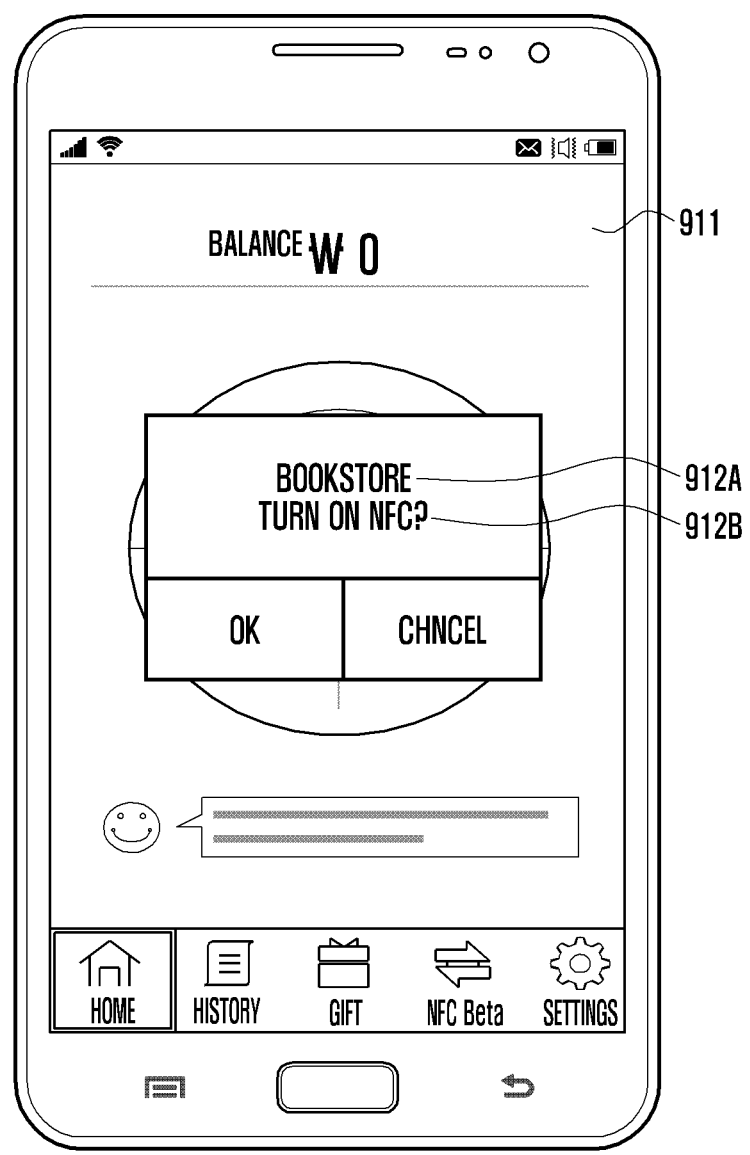
FIGS. 9A, 9B, 9C, 9D, and 9E illustrate an example of recommending at least one second application while a first application is executed according to an embodiment of the present disclosure.

Referring to FIG. 9A, the portable terminal 100 may provide a first application 911 being executed on a display unit. At this time, the first application 911 may be an application selected and executed by the user. Alternatively, the first application 911 may be an application automatically provided by the portable terminal 100. For example, based on the use log of the portable terminal 100 collected in a previous context state identical or similar to a current context state of the user (for example, a place where the user is currently located), the portable terminal 100 may determine the first application 911 having the highest use frequency in the context state and automatically provide the determined first application 911.

At this time, a current context state 912A of the user (for example, a bookstore or a mart corresponding to a place where the user is currently located) may be provided to the touch screen 540. For example, when the place where the user is currently located is the bookstore, the portable terminal may provide the message 912A of "Bookstore" to the user. Further, the portable terminal may automatically provide a message 912B of inquiring about whether to use Near Field Communication (NFC) to obtain information on payment of a book or a miscellaneous good and information on the book or the miscellaneous good through the NFC. For example, the portable terminal may provide the notification message 912B of "turn on NFC?" to the user.

Figure 9B:
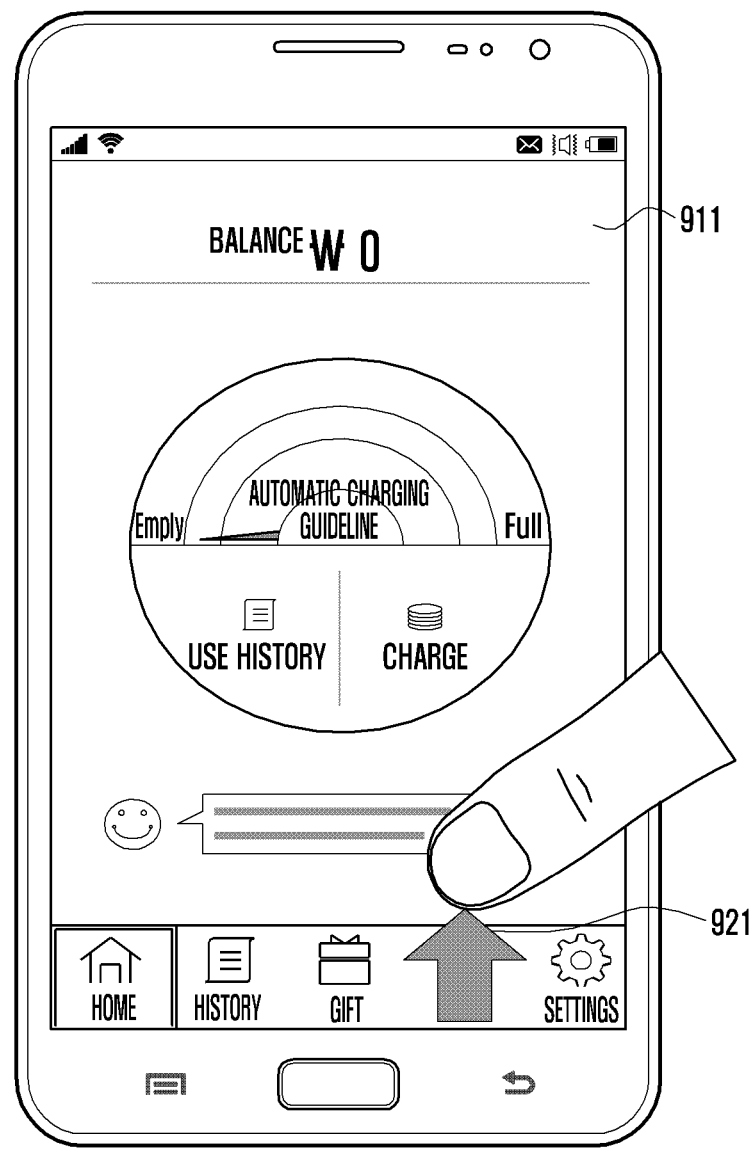

Referring to FIG. 9B, the portable terminal 100 may detect a user's gesture 921 of performing a touch drag in a direction from one side of the touch screen 540 to a center of the touch screen 540. At this time, the user's gesture 921 may be a touch drag gesture or a flick gesture.

Figure 9C:
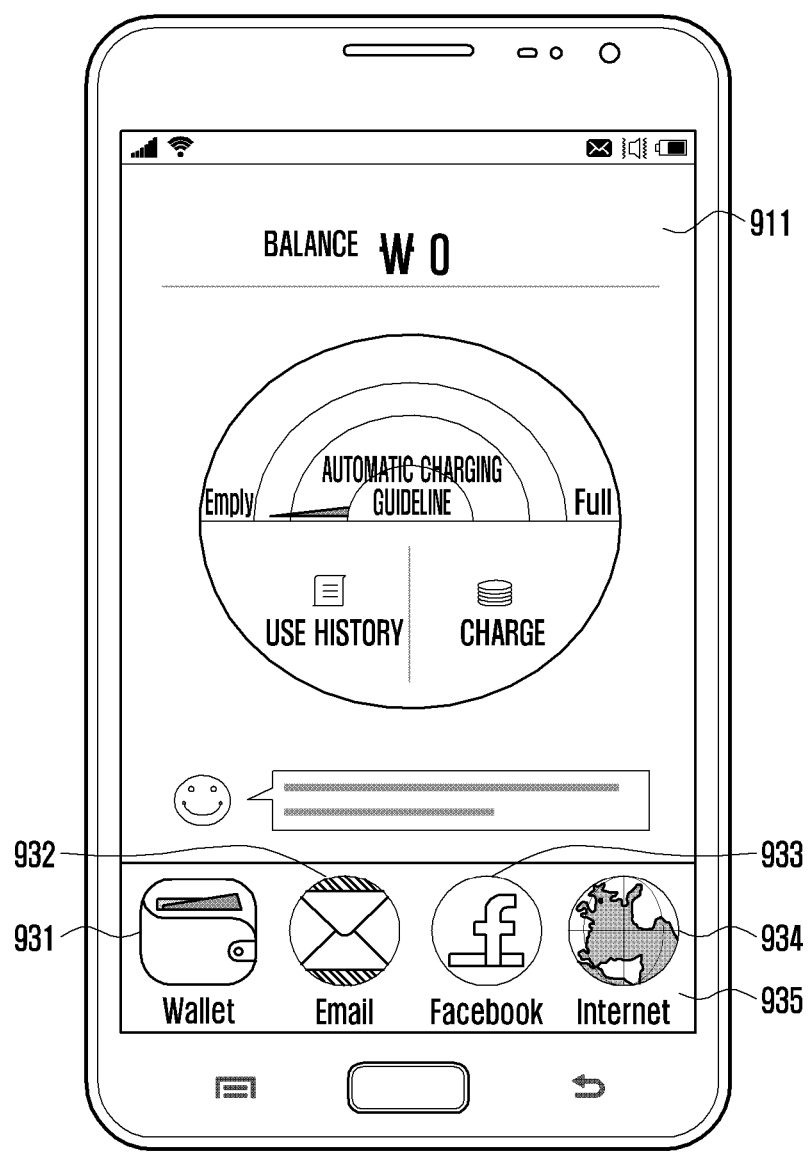

Referring to FIG. 9C, the portable terminal 100 may gradually display an area 935 including icons 931, 932, 933 and 934 of a plurality of second applications related to the first application 911 being executed, based on information collected in a previous state identical or similar to the current context state of the user in response to the user's gesture 921. At this time, displaying the area based on the information collected in the previous state identical or similar to the current context state of the user may be based on a statistic result generated by analyzing the use log collected in the previous context state identical or similar to the current context state of the user. For example, the portable terminal may determine applications which have been executed a threshold number of times or more within a threshold period of time before or after the first application 911 is executed in the previous context state identical or similar to the current context state of the user as the second applications and gradually display the area 935 including the icons 931 to 934 of the second applications.

Figure 9D:
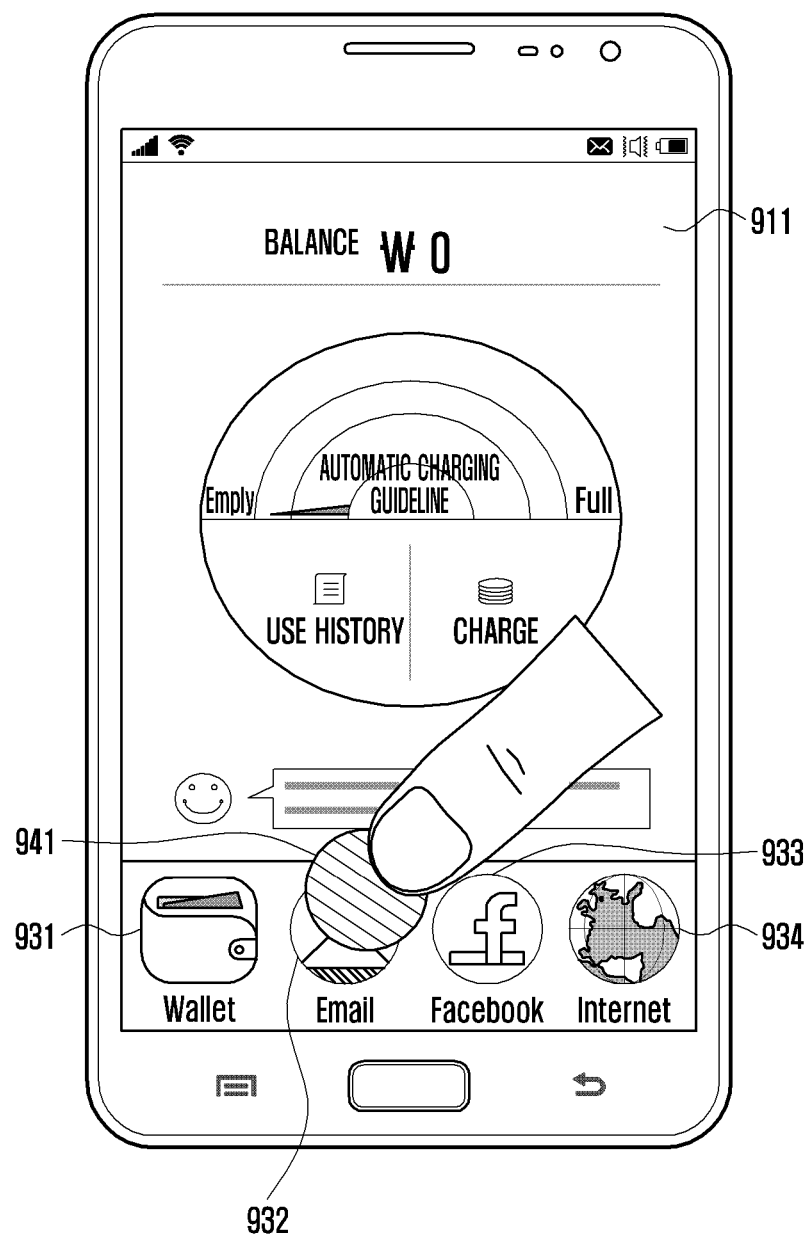

Referring to FIG. 9D, the portable terminal may detect a user's gesture 940 of selecting the icon 932 of at least one application from the icons 931 to 934 of the plurality of second applications. At this time, the user's gesture 941 may be a gesture of maintaining a touch for a threshold time or a gesture of performing a touch and then a touch drag in an upward direction in which the first application 911 is located.

Figure 9E:
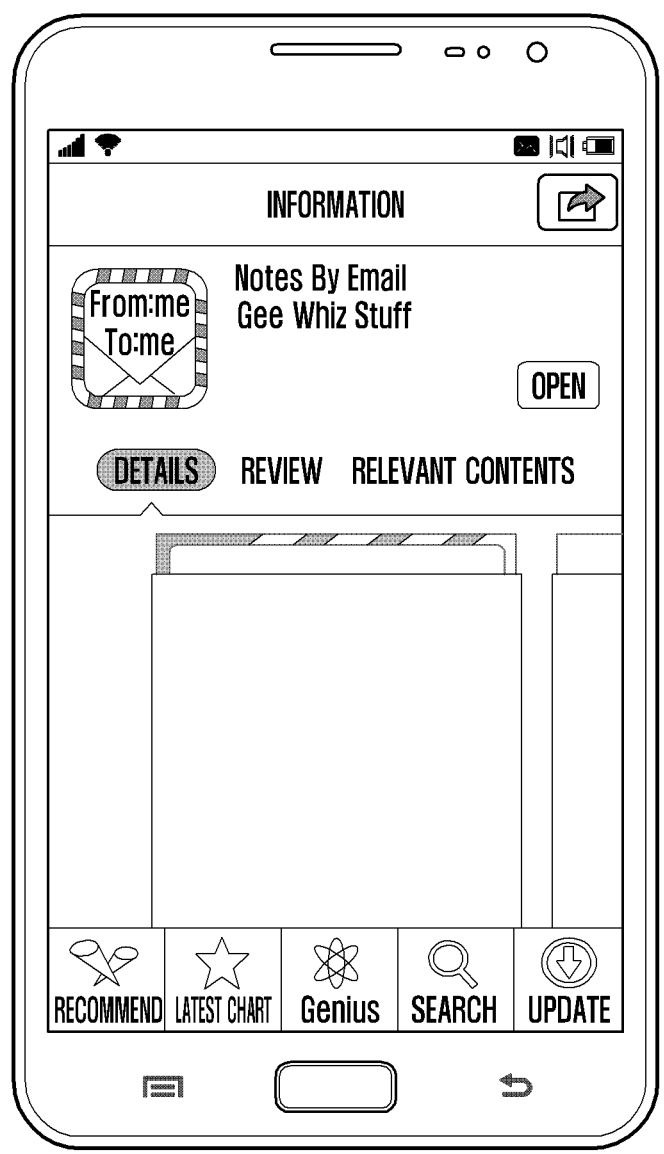

Referring to FIG. 9E, the portable terminal 100 may execute and display at least one selected second application in response to the user's gesture 941. At this time, the second application may be provided in a foreground state on the first application 911 or provided together with the first application 911 in a form of a sub-window.

FIGS. 10A to 10E illustrate an example of recommending at least one second application while a first application is executed according to an embodiment of the present disclosure.

Figure 10A:
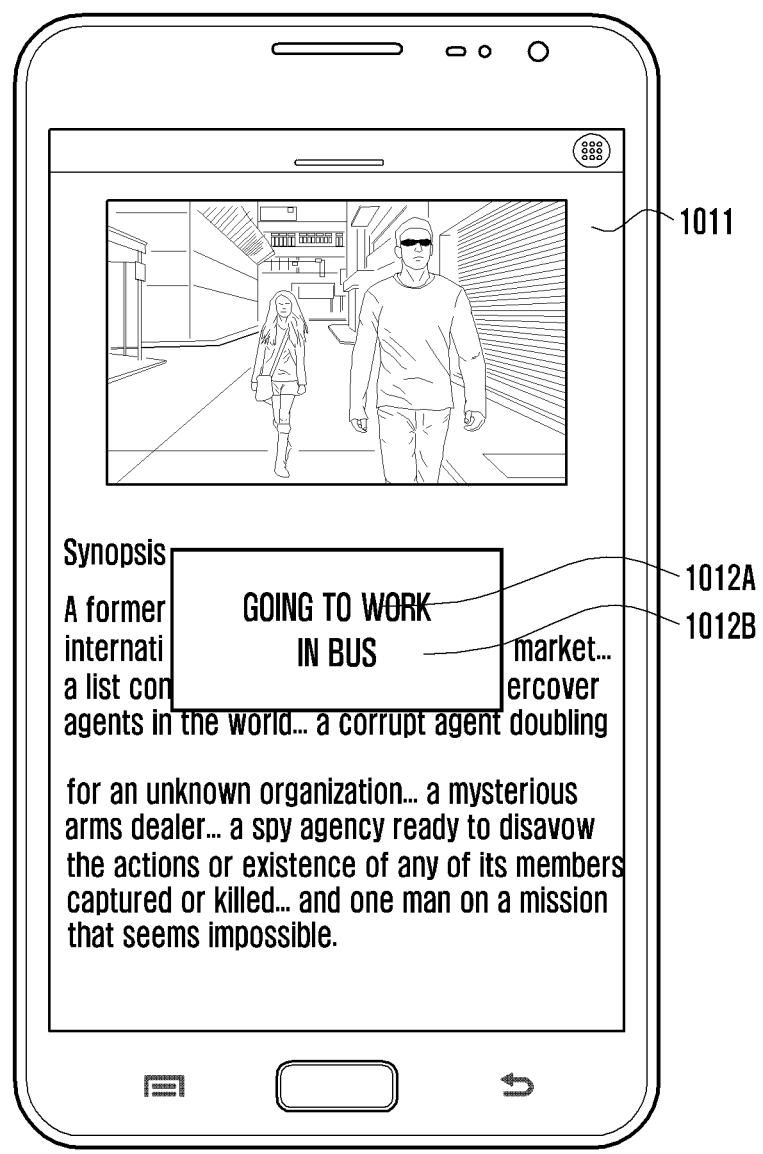
FIGS. 10A, 10B, 10C, 10D, and 10E illustrate an example of recommending at least one second application while a first application is executed according to an embodiment of the present disclosure.

Referring to FIG. 10A, the portable terminal 100 may provide a first application 1011 being executed to a display unit. At this time, the first application 1011 may be an application selected and executed by the user. Alternatively, the first application 1011 may be an application automatically provided by the portable terminal 100. For example, based on the use log of the portable terminal 100 collected in a previous context state identical or similar to a current context state of the user (for example, a state where the user is back from work or going to work), the portable terminal 100 may determine the first application 1011 having the highest use frequency in the context state and automatically provide the determined first application 1011. For example, when an application which is most frequently used by the user while the user is going to work is a news related app, the portable terminal 100 may automatically execute and display the news related app if a current context state of the user is determined as a state of going to work.

At this time, one or more current context states 1012A and 1012B of the user may be provided to the touch screen 540. For example, when the current context state of the user is a state of going to work from home, the portable terminal 100 may provide a message 1012A of "going to work" to the user. Further, when a place where the user is located is a bus, the portable terminal 100 may provide a message 1012B of "in a bus" to the user.

Figure 10B:
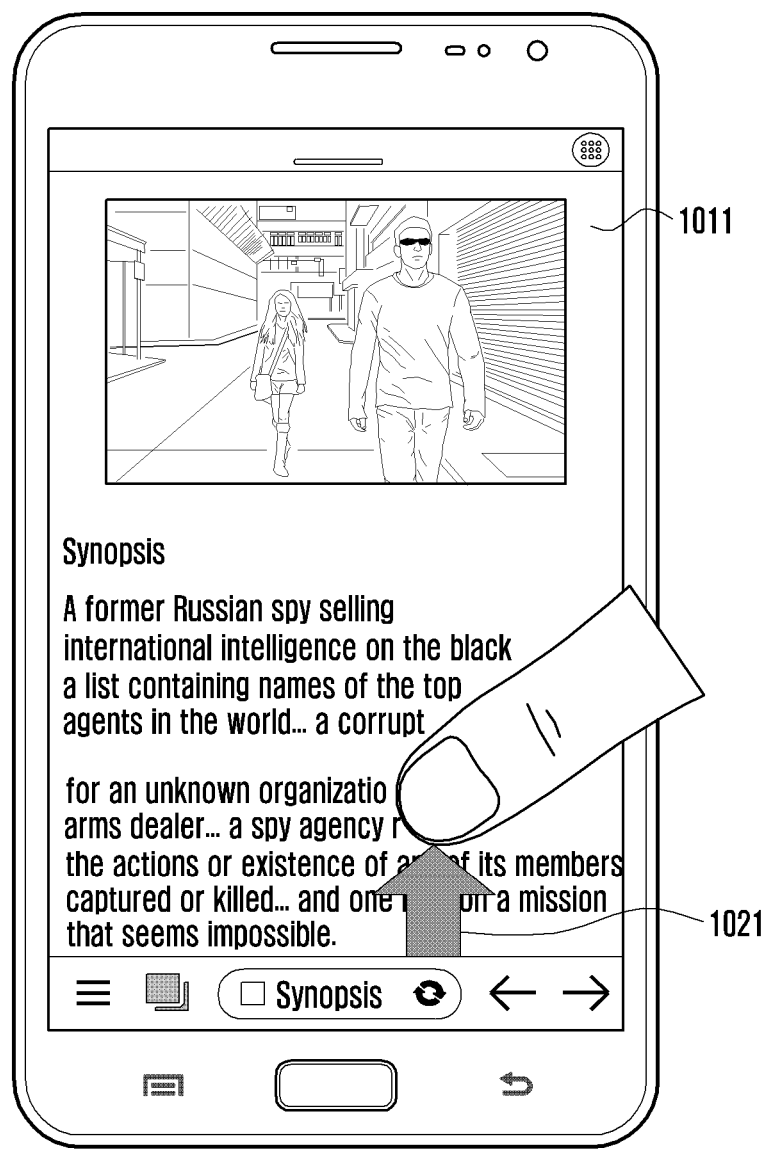

Referring to FIG. 10B, the portable terminal 100 may detect a user's gesture 1021 of performing a touch drag in a direction from one side of the touch screen 540 to a center of the touch screen 540. At this time, the user's gesture 1021 may be a touch drag gesture or a flick gesture.

Figure 10C:
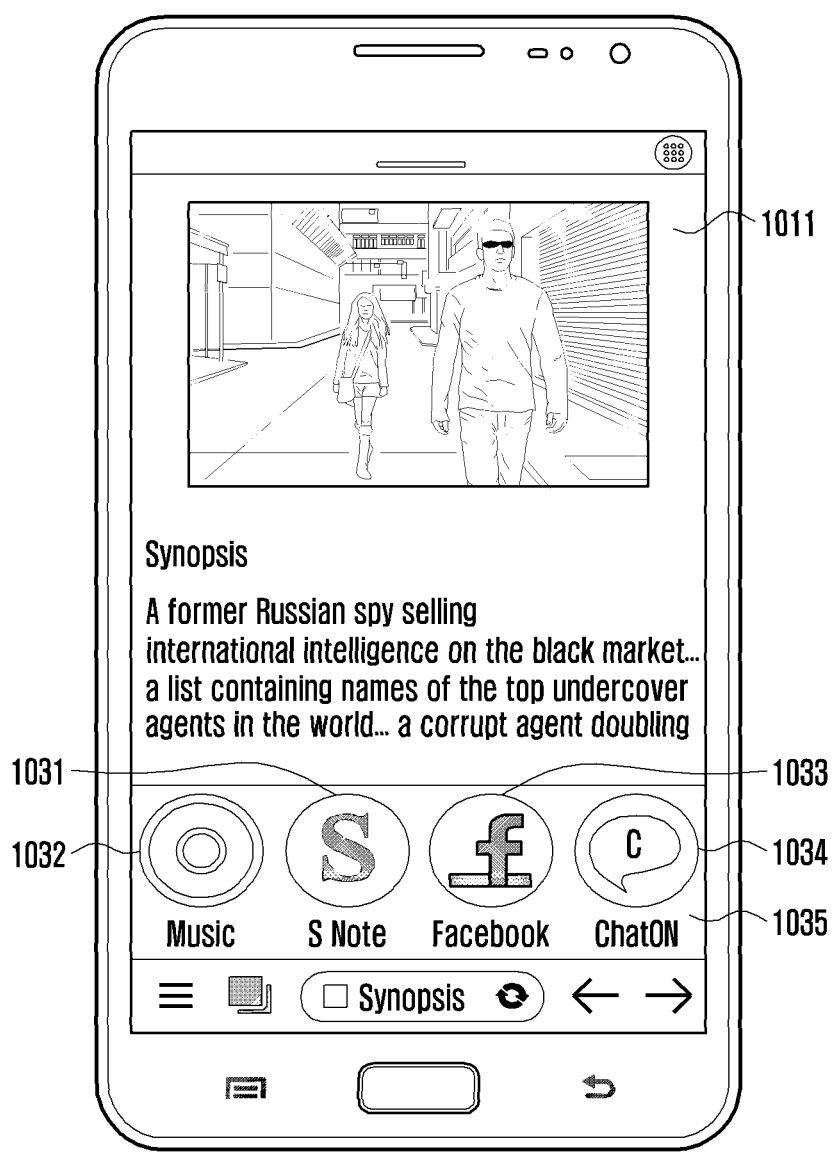

Referring to FIG. 10C, the portable terminal 100 may gradually display an area 1035 including icons 1031, 1032, 1033, and 1034 of a plurality of second applications related to the first application 1011 being executed, based on information collected in a previous state identical or similar to the current context state of the user in response to the user's gesture 1021. At this time, displaying the area based on the information collected in the previous state identical or similar to the current context state of the user may be using a statistic result generated by analyzing the use log collected in the previous context state identical or similar to the current context state of the user. For example, the portable terminal 100 may determine applications which have been executed a threshold number of times or more within a threshold period of time before or after the first application 1011 is executed in the previous context state identical or similar to the current context state of the user as the second applications and gradually display the area 1035 including the icons 1031 to 1034 of the second applications. As an example, when the first application is the news related app, a Music app, an S-Note app, a Facebook app, and a ChatON app are determined as second applications which have been executed within 5 minutes before or after the first application is executed and the area 1035 including the icons 1031 to 1304 of the apps may be displayed.

Figure 10D:
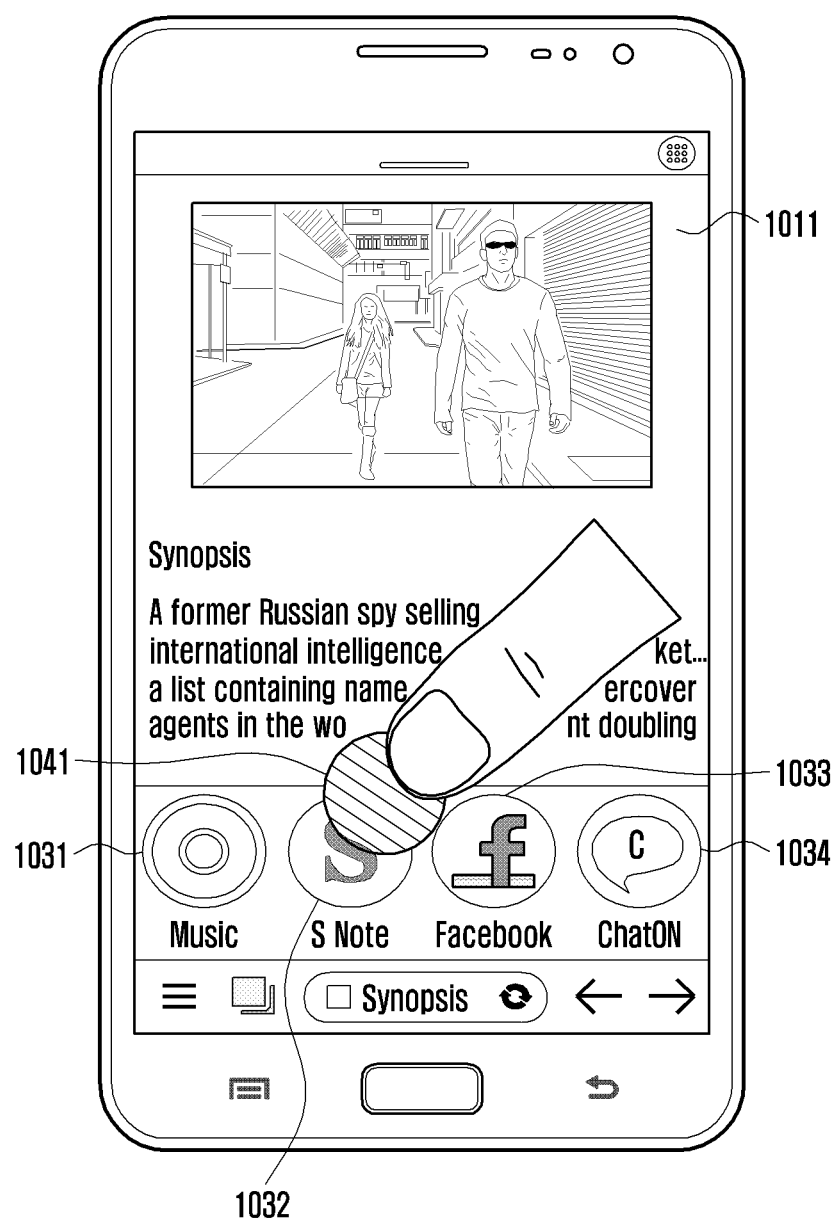

Referring to FIG. 10D, the portable terminal may detect a user's gesture 1041 of selecting the icon 1032 of at least one application from the icons 1031 to 1034 of the plurality of second applications. At this time, the user's gesture 1041 may be a gesture of maintaining a touch for a threshold time or a gesture of performing a touch and then a touch drag in an upward direction in which the first application 1011 is located.

Figure 10E:
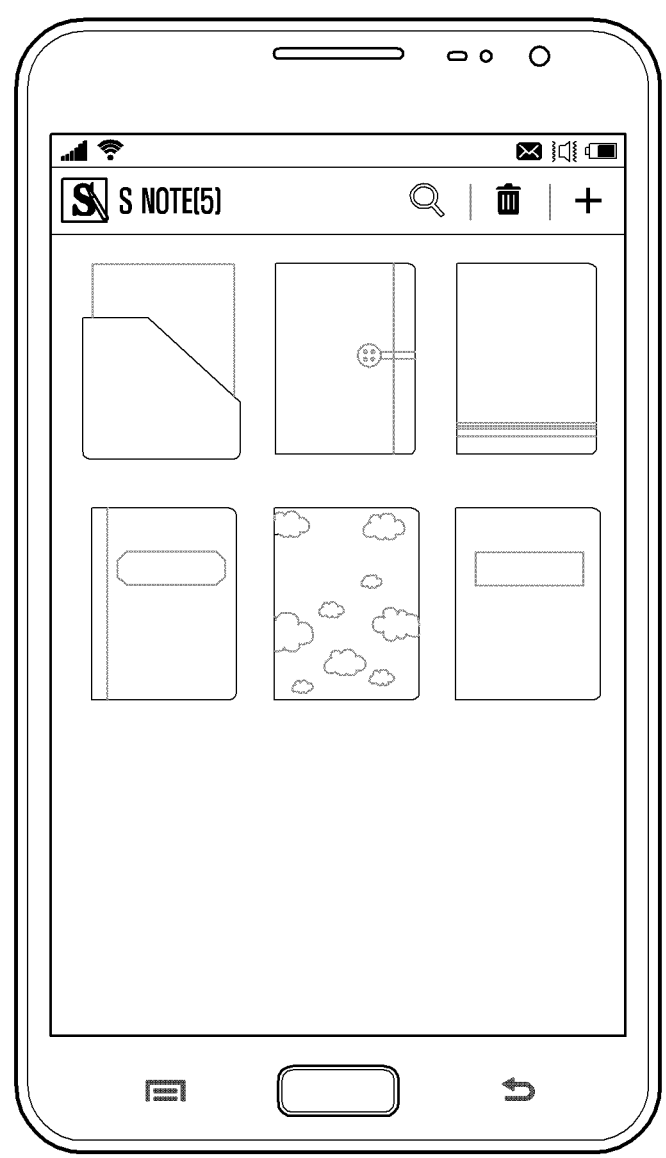

Referring to FIG. 10E, the portable terminal 100 may execute and display at least one selected second application in response to the user's gesture 1041. At this time, the second application may be provided in a foreground state on the first application 1011 or provided together with the first application 1011 in a form of a sub-window.

It may be appreciated that the various embodiments of the present disclosure can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium.

It will be appreciated that a method of using a use log of a portable terminal and an apparatus using the same according to the present disclosure may be implemented by a computer or a portable terminal including a controller and a memory, in which the memory may be an example of a machine-readable storage medium that is suitable for storing one or more programs including instructions for implementing various embodiments of the present disclosure. Accordingly, the present disclosure includes a program including a code for implementing the apparatus and method described in the appended claims of the specification and a machine (computer or the like)-readable storage medium for storing the program. The method of using the use log of the portable terminal and the apparatus using the same may receive the program from a program providing apparatus connected wireless or through a wire and store the received program. Further, the user may selectively limit operations according to various embodiments of the present disclosure within the user terminal or expand the operations to interworking with a server through a network.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of using a use log of a portable terminal, the method comprising:
providing a first application being executed on a display unit; and
providing an indicator, on a partial portion of the first application, associated with a second application, the second application being determined based on information collected in a previous context state identical or similar to a current context state of a user and a location coordinate,
wherein, if a power level of the portable terminal is equal to or less than a predetermined threshold, the location coordinate of the portable terminal is determined based on a network identifier received from an access point (AP) and, if the power level of the portable terminal is greater than the predetermined threshold, the location coordinate of the portable terminal is determined based on a global positioning system (GPS).

2. The method of claim 1, wherein the second application related to the first application comprises an application which has been executed within a threshold time before or after the first application is executed in the previous context state identical or similar to the current context state of the user.

3. The method of claim 2, wherein the second application related to the first application comprises an application which has been executed a threshold number of times or more within a threshold time before or after the first application is executed.

4. The method of claim 1, further comprises providing the second application based on a statistic result generated by analyzing a use log collected in the previous context state identical or similar to the current context state of the user.

5. The method of claim 1, wherein the context state comprises one or more of a moving state in a specific place, a staying state in a specific place, a state of entering a specific place, a state of leaving a specific place, a state of going to work, a state of returning from work, a state of using a means of transportation, and a user action state.

6. The method of claim 1, wherein, when the current context state of the user corresponds to a place where the user is currently located, the previous context state identical or similar to the current context state corresponds to a place identical to the place, a place within a threshold range from the place, a place having a name identical to that of the place, or a place having a type identical to that of the place.

7. The method of claim 1, further comprising:
providing a third application related to the first application being executed,
wherein the displaying of the indicator associated with the second application comprises displaying an icon of the second application in response to a user input of performing a touch drag in a direction from one side of a touch screen to a center of the touch screen.

8. The method of claim 1, further comprising providing information on the current context state of the user on a touch screen.

9. The method of claim 1, further comprises determining the current context state of the user based on information related to a location of the portable terminal and information related to a current time.

10. The method of claim 1, further comprises displaying the second application on the display unit in response to a user input of selecting the indicator associated with the second application.

11. A portable terminal using a use log, the portable terminal comprising:
a processor configured to:
provide a first application being executed on a display unit of the portable terminal, and
provide an indicator, on a partial portion of the first application, associated with a second application, the second application being determined based on information collected in a previous context state identical or similar to a current context state of a user and a location coordinate,
wherein, if a power level of the portable terminal is equal to or less than a predetermined threshold, the location coordinate of the portable terminal is determined based on a network identifier received from an access point (AP) and, if the power level of the portable terminal is greater than the predetermined threshold, the location coordinate of the portable terminal is determined based on a global positioning system (GPS).

12. The portable terminal of claim 11, wherein the second application related to the first application comprises an application which has been executed within a threshold time before or after the first application is executed in the previous context state identical or similar to the current context state of the user.

13. The portable terminal of claim 12, wherein the second application related to the first application comprises an application which has been executed a threshold number of times or more within a threshold time before or after the first application is executed.

14. The portable terminal of claim 11, wherein the processor provides the second application related to the first application being executed by using a statistic result generated by analyzing a use log collected in the previous context state identical or similar to the current context state of the user.

15. The portable terminal of claim 11, wherein the context state comprises one or more of a moving state in a specific place, a staying state in a specific place, a state of entering a specific place, a state of leaving a specific place, a state of going to work, a state of returning from work, a state of using a means of transportation, and a user action state.

16. The portable terminal of claim 11, wherein, when the current context state of the user corresponds to a place where the user is currently located, the previous context state identical or similar to the current context state corresponds to a place identical to the place, a place within a threshold range from the place, a place having a name identical to that of the place, or a place having a type identical to that of the place.

17. The portable terminal of claim 11,
wherein the processor is further configured to provide a third application related to the first application being executed, and
wherein the display unit is further configured to display an icon of the second application in response to a user input of performing a touch drag through the user input unit.

18. The portable terminal of claim 11, wherein the display unit is further configured to display information on the current context state of the user.

19. The portable terminal of claim 11, wherein the processor is further configured to determine the current context state of the user by using information related to a location of the portable terminal and information related to a current time.

20. The portable terminal of claim 11, wherein the display unit is further configured to display the second application on the display unit in response to a user input of selecting the indicator associated with the second application.

* * * * *